(12) United States Patent
Ikegaya

(10) Patent No.: US 8,700,853 B2
(45) Date of Patent: Apr. 15, 2014

(54) STORAGE APPARATUS AND DATA MANAGEMENT METHOD

(75) Inventor: Naoko Ikegaya, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/503,998

(22) PCT Filed: Apr. 13, 2012

(86) PCT No.: PCT/JP2012/002580
§ 371 (c)(1),
(2), (4) Date: Apr. 25, 2012

(87) PCT Pub. No.: WO2013/153581
PCT Pub. Date: Oct. 17, 2013

(65) Prior Publication Data
US 2013/0275680 A1    Oct. 17, 2013

(51) Int. Cl.
G06F 12/00    (2006.01)
(52) U.S. Cl.
USPC ............................. 711/118; 711/113; 711/122
(58) Field of Classification Search
USPC ......................................................... 711/118
See application file for complete search history.

(56) References Cited

U.S. PATENT DOCUMENTS

| 2010/0082896 | A1 | 4/2010  | Orikasa et al.   |
| 2011/0167236 | A1 | 7/2011  | Orikasa et al.   |
| 2011/0264855 | A1 | 10/2011 | Kasako           |
| 2011/0289287 | A1 | 11/2011 | Yamamoto et al.  |

OTHER PUBLICATIONS

1 PCT International Search Report and Written Opinion on application No. PCT/JP2012/002580 mailed Aug. 21, 2012; 8 pages.

Primary Examiner — Reginald Bragdon
Assistant Examiner — Hamdy S Ahmed
(74) Attorney, Agent, or Firm — Foley & Lardner LLP

(57) ABSTRACT

A storage apparatus which is connected via a network to a host which issues data I/O requests comprises storage devices of a plurality of types of varying performance, and a control unit which manages each storage area provided by each of the storage devices of a plurality of types by means of storage tiers of a plurality of different types, and which assigns storage areas in pre-determined units to virtual volumes from any storage tier among the storage tiers of a plurality of types in accordance with a data write request from the host, wherein, if there is an I/O request from the host, the control unit stores data corresponding to the I/O request in predetermined units in the cache memory and determines the storage tier of the storage area assigned to the virtual volume storing the data according to the mode of writing to the cache memory.

10 Claims, 22 Drawing Sheets

FIG. 6

COMMAND FORMAT

| COMMAND 601 | OPERAND 602 |
|---|---|

COMMAND TO DEFINE CACHE MODE IN EXTENT

| Define Extent | CONTROL INFORMATION | CACHE MODE | EXTENT RANGE |
|---|---|---|---|

CACHE MODE
- Cache Fast Write
- DASD Fast Write
- Normal
- Bypass Cache
- Sequential

COMMAND TO DISCARD DATA IN CACHE

| Perf Sub Func | ORDER CODE | CONTROL INFORMATION | EXTENT RANGE |
|---|---|---|---|

ORDER CODE
- Discard
- Prepare for Read Subsystem Data
- Destage Modified Tracks
- Commit
- :

FIG.7

| VIRTUAL VOL NUMBER | EXTENT NUMBER | CACHE MODE |
|---|---|---|
| VVOL1 | 1 | CFW |
| | 2 | — |
| | 3 | BIND |
| ⋮ | ⋮ | ⋮ |
| 4101 | 4102 | 4103 |

| VIRTUAL VOL NUMBER | EXTENT NUMBER | PAGE NUMBER |
|---|---|---|
| VVOL1 | 1 | page1 |
| | 2 | page2 |
| | 3 | page3 |
| | | page4 |
| ⋮ | ⋮ | ⋮ |
| 4201 | 4202 | 4203 |

| POOL NUMBER | PG NUMBER | AREA ADDRESS | ASSIGNMENT STATE | VIRTUAL VOL NUMBER |
|---|---|---|---|---|
| Pool1 | PG01 | 1 | ASSIGNED | VVOL01 |
|  |  | 2 | UNASSIGNED | — |
|  |  | 3 | ASSIGNED | VVOL01 |
|  | PG02 | 1 | ASSIGNED | VVOL01 |
|  |  | 2 | UNASSIGNED | — |
| ⋮ | ⋮ | ⋮ | ⋮ | ⋮ |
| 4301 | 4302 | 4303 | 4304 | 4305 |

| POOL NUMBER | PG NUMBER | MEDIA TYPE | STORAGE TIER |
|---|---|---|---|
| Pool1 | PG01 | SSD | Tier0 |
|  | PG02 | SAS | Tier1 |
|  | PG03 | SATA | Tier2 |
| Pool2 | PG04 | SSD | Tier0 |
|  | PG05 | SAS | Tier1 |
| ⋮ | ⋮ | ⋮ | ⋮ |
| 4401 | 4402 | 4403 | 4404 |

| VIRTUAL VOL NUMBER | PAGE NUMBER | ASSIGNED PG NUMBER | AREA ADDRESS | DISCARD MARK |
|---|---|---|---|---|
| VVOL1 | page1 | PG01 | 1 | Off |
| | page2 | PG02 | 2 | Off |
| | page3 | UNASSIGNED | — | — |
| | page4 | PG02 | 1 | ON |
| ⋮ | ⋮ | ⋮ | ⋮ | ⋮ |

| CFW AREA NUMBER | VIRTUAL VOL NUMBER | EXTENT NUMBER | UPDATE TIME |
|---|---|---|---|
| 0 | 1 | 1 | T1 |
| 1 | 1 | 2 | T2 |
| 2 | 2 | 1 | T3 |
| 3 | UNASSIGNED | — | — |
| ⋮ | ⋮ | ⋮ | ⋮ |

| CACHE MODE | DEFAULT | SET RULES | |
|---|---|---|---|
| CFW | LOWER TIER PRIORITY | — | |
| BIND | LOWER TIER PRIORITY | — | |
| Sequential | INTERMEDIATE TO LOWER TIER PRIORITY | LOWER TIER PRIORITY | |
| Bypass | INTERMEDIATE TO LOWER TIER PRIORITY | NO REDISPOSITION | 2000 |
| 2010 | 2020 | 2030 | |

FIG. 24

| VIRTUAL VOL NUMBER | LBA | MAPPED PAGE |
|---|---|---|
| VVOL1 | 0GB-1GB | page0 |
| | 1GB-2GB | page1 |
| | 5GB-6GB | UNASSIGNED |
| ⋮ | ⋮ | ⋮ |

2310  2320  2330

2300

STORAGE APPARATUS AND DATA MANAGEMENT METHOD

TECHNICAL FIELD

The present invention relates to a storage apparatus and a data management method and is suitably applied to a storage apparatus and data management method with which real storage areas are assigned to virtual volumes.

BACKGROUND ART

Typically, a storage apparatus contains a controller comprising a cache memory and controls writing to a storage device in accordance with instructions from a host. Here, as a method of controlling a storage device, the following three control modes are mainly known. A first control mode is a method in which write processing is terminated at the time when data is written to a cache memory and the data in the cache memory is subsequently written to the storage device at a suitable time, and this mode is called write-after processing. Further, a second control mode is a method in which the processing is terminated after compulsorily writing the data to the storage device. In addition, the third control mode is a method in which data is written only to the cache memory and is called cache fast write (hereinafter also described as CFW: Cash Fast Write) processing and is used in writing generally used data such as a sort work file.

Meanwhile, nowadays, a storage apparatus logically converts physical storage areas which a multiplicity of storage devices comprise and provides the resulting logical storage areas to the host as virtual volumes. The host accesses the virtual volumes provided by the storage apparatus and performs data I/Os to/from the virtual volumes.

In addition, one such storage area logical conversion technology is hierarchical data management technology. With hierarchical management technology, a plurality of storage areas provided by a plurality of storage devices are managed as storage area groups for assigning virtual volumes. The storage area groups are categorized into a plurality of tiers according to the attributes of the storage devices. The plurality of tiers comprise, for example, an upper storage tier which comprises storage areas of high-speed and high-performance storage devices as well as a lower storage tier which comprises storage areas of low-speed and low-performance storage devices.

For example, PTL1 discloses a hierarchical data management technology which manages the frequencies of access by a host to each of the data written to the virtual volumes, migrates data of a high access frequency to a storage area provided by a high-speed and high-performance storage tier, and migrates data of a low access frequency to a storage area provided by a low-speed and low-performance storage tier. Cost-performance improvements for storage apparatuses are thus achievable.

Furthermore, according to PTL2, applications mounted on a host, virtual volumes from/to which the applications read and write data, and policies for associating storage tiers in which storage areas are assigned to the virtual volumes, and priority rankings, are managed. Further, in response to a write request from an application to write to a virtual volume, a storage area is assigned to the virtual volume from a storage tier with a higher priority ranking according to the corresponding policy. It is possible to prelimit the storage tier to which the storage area is assigned for each application when the application writes data to the virtual volume, and therefore a performance-stable operation for the virtual volumes can be realized.

CITATION LIST

Patent Literature

PTL 1: U.S. Patent Published Application No. 2011/0167236
PTL 2: U.S. Patent Published Application No. 2011/0289287
PTL 3: U.S. Patent Published Application No. 2010/0082896

SUMMARY OF INVENTION

Technical Problem

However, in the foregoing PTL1 and PTL2, the storage tier in which the storage area is to be assigned to the area where the data of the virtual volume is written is determined on the basis of the frequency of access by the host or a preset policy, and no consideration has been given to cache memory control modes for the data for which the host requests writing to the storage apparatus. For example, as mentioned earlier, for temporary data for which cache fast write (CFW) processing has been instructed by the host, if the access frequency is high, a storage area is assigned from the high performance storage tier. As a result, there is a problem in that the storage area of the high-performance storage tier is depleted and storage area is not assigned from the high-performance storage tier to highly important application data.

The present invention was conceived in view of the foregoing points and proposes a storage apparatus and a data management method with which storage area assignment can be specified in accordance with cache memory control modes.

Solution to Problem

In order to achieve the foregoing object, the present invention provides a storage apparatus which is connected via a network to a host which issues data I/O requests, comprising storage devices of a plurality of types of varying performance; and a control unit which manages each storage area provided by each of the storage devices of a plurality of types by means of storage tiers of a plurality of different types, and which assigns storage areas in predetermined units to virtual volumes from any storage tier among the storage tiers of a plurality of types in accordance with a data write request from the host, wherein, if there is an I/O request from the host, the control unit stores data corresponding to the I/O request in predetermined units in the cache memory and determines the storage tier of the storage area assigned to the virtual volume storing the data according to the mode of writing to the cache memory.

With this configuration, if there is an I/O request from a host, a storage tier of a storage area which is assigned to the virtual volume storing data corresponding to the I/O request is determined according to a cache memory writing mode. Accordingly, when data which is written only to the cache memory is stored on a storage medium, the storage capacity of the storage medium can be utilized effectively by rapidly placing the data in a suitable tier.

Advantageous Effects of Invention

With the present invention, the storage capacity of a storage medium can be effectively utilized by specifying assignment of storage areas in accordance with control modes for the cache memory and rapidly placing the data in a suitable tier.

BRIEF DESCRIPTION OF DRAWINGS

FIG. 6 is a conceptual diagram of content of extent definition commands according to this embodiment.

FIG. 7 is a table showing the content of a cache mode management table according to this embodiment.

FIG. 8 is a table showing the content of an extent management table according to this embodiment.

FIG. 9 is a table showing the content of a virtual volume pool management table according to this embodiment.

FIG. 10 is a table showing the content of a storage tier management table according to this embodiment.

FIG. 11 is a table showing the content of a virtual volume page assignment management table according to this embodiment.

FIG. 12 is a table showing the content of a CFW area management table according to this embodiment.

FIG. 21 is a table showing content of a tier disposition rule management table according to this embodiment.

FIG. 24 is a table showing the content of a cache resident page management table according to a third embodiment.

DESCRIPTION OF EMBODIMENTS

Figure 1:
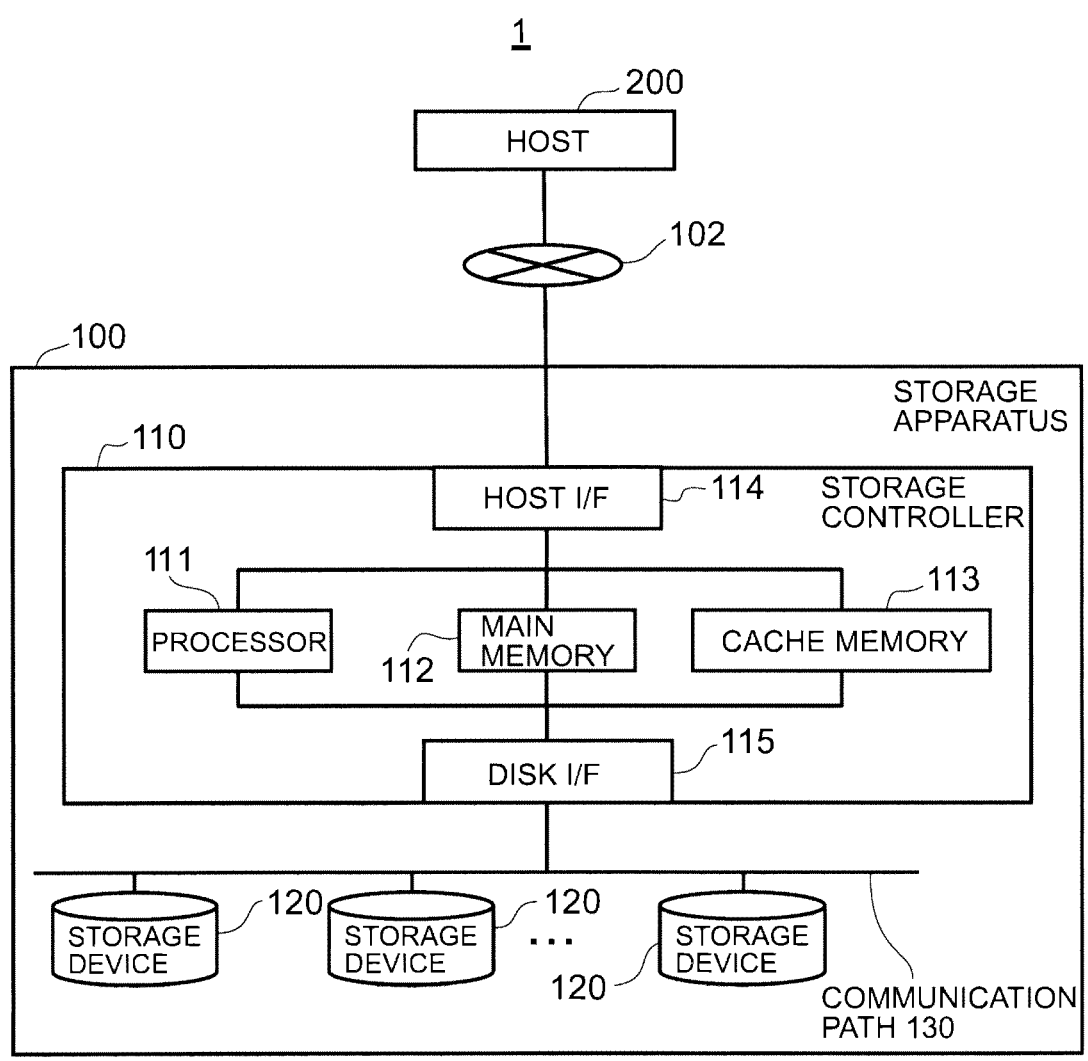
FIG. 1 is a block diagram showing a configuration of a computer system according to a first embodiment of the present invention.

An embodiment of the present invention will be described in detail with reference to the drawings hereinbelow.

(1) First Embodiment (1-1) Overview of the Embodiment

An overview of the embodiment will be described first. Typically, the storage apparatus contains a controller comprising a cache memory and controls writing to a storage device according to instructions from a host. Here, as methods for controlling storage devices, the following three control modes are mainly known. A first control mode is a method in which write processing is terminated at the moment when data is written to the cache memory and the data in the cache memory is subsequently written to the storage device at a suitable time, and this mode is called write-after processing. Further, a second control mode is a method in which the processing is terminated after compulsorily writing the data to the storage device. In addition, a third control mode is a method in which data is written only to the cache memory and is called cache fast write (hereinafter also described as CFW: Cash Fast Write) processing and is used in writing temporarily used data such as a sort work file.

In CFW processing, if the cache space for CFW is insufficient, temporary data with the oldest CFW in a cache memory is cleared from the storage device. Furthermore, if a temporary data discard request has been received from the host, a temporary data storage area which corresponds to the data is invalidated.

Meanwhile, recently, a storage apparatus logically converts physical storage areas which a multiplicity of storage devices comprise and provides the logical storage areas to the host as virtual volumes. The host accesses the virtual volumes provided by the storage apparatus and performs data I/Os to/from the virtual volumes.

In addition, one such storage area logical conversion technology is hierarchical data management technology. With hierarchical management technology, a plurality of storage areas provided by a plurality of storage devices are managed as storage area groups for assigning virtual volumes. The storage area groups are categorized into a plurality of tiers according to the storage device attributes. The plurality of tiers comprise, for example, an upper storage tier which comprises storage areas of high-speed and high-performance storage devices as well as a lower storage tier which comprises storage areas of low-speed and low-performance storage devices.

For example, a hierarchical data management technology has been disclosed which manages the frequency of access by the host to each of the data written to the virtual volumes, migrates data of a high access frequency to a storage area provided by a high-speed and high-performance storage tier, and migrates data of a low access frequency to a storage area provided by a low-speed and low-performance storage tier. Cost-performance improvements for storage apparatuses are thus achievable.

Furthermore, a technology is disclosed which manages applications mounted on a host, virtual volumes from/to which the applications read and write data, and policies for associating storage tiers in which storage areas are assigned to the virtual volumes, and priority rankings. With this technology, in response to a write request from an application to write to a virtual volume, a storage area is assigned to the virtual volume from a storage tier with a higher priority ranking according to the corresponding policy. It is possible to prelimit the storage tier to which the storage area is assigned for each application when the application writes data to the virtual volume, and therefore a performance-stable operation for the virtual volumes can be realized.

In addition, a technology is disclosed in which the storage apparatus reads data from a storage area assigned to a virtual volume, determines whether the data thus read includes only data of a predetermined pattern and, if the data includes only data of a predetermined pattern, cancels the storage area assignment. With this technology, data which is stored in duplicate in the storage area is removed to make effective usage of the physical storage area assigned to the virtual volume.

However, with the foregoing PTL1 and PTL2, the storage tier to which a storage area is to be assigned in an area where the data of a virtual volume is written is determined on the basis of the frequency of access by the host or a preset policy, and no consideration is paid to cache memory control modes for data for which a write request requesting writing to the storage apparatus by the host is received. For example, as described earlier, even for temporary data for which cache fast write (CFW) processing is instructed by the host, if the access frequency is high, storage area is assigned from a high-performance storage tier. As a result, there is a problem in that the storage area of the high-performance storage tier is depleted and there is no assignment of storage area from the high-performance storage tier to data of a high-importance application.

Moreover, in order to monitor the access frequency and determine the storage area for data redisposition from the result of this monitoring, it takes time until inconsistencies in the access frequency are clarified. For example, if temporary data for which cache fast write has been instructed by the host is cleared from the storage area, it may take a day until it is determined that subsequently accessing the storage area will not take a long time.

In addition, there is a problem in that, even if data in the cache memory corresponding to the temporary data is discarded when it is determined by the host to be unnecessary, because data is not discarded from the storage area on the storage medium, the unnecessary data continues to occupy the storage area on the storage medium.

Therefore, in this embodiment, storage area assignment is specified according to control modes for the cache memory. As a result, the storage capacity of a storage medium can be effectively utilized by rapidly placing the data in a suitable tier.

(1-2) Computer System Configuration

The configuration of a computer system 1 according to this embodiment will be described next. As shown in FIG. 1, the computer system 1 is configured from at least one storage apparatus 100, at least one host 200, and a network 102. The storage apparatus 100 is also known as a storage system or a storage subsystem. Further, the host 200 may exemplify a mainframe or a server or the like.

Further, the storage apparatus 100 and the host 200 are connected via a network 102. The network 102 is a data network, and if the host 200 is a mainframe, sends and receives channel commands and transfers data via the network.

In this embodiment, virtual volumes comprising virtual storage areas are managed by the storage apparatus 100 and a pool storage area comprising a plurality of storage devices is dynamically assigned to the virtual storage areas of the virtual volumes. Here, the plurality of storage devices include a mixture of storage devices with different properties, being configured from a high-performance upper tier and a lower tier which is not a high-performance tier, for example. Furthermore, if the host 200 is a mainframe, data reading and writing are performed on the virtual volumes in virtual storage area units called extents. Further, if the host 200 is a mainframe, cache modes are designated in extent units. When data is read/written, this means that a cache mode has been designated for usage in some way.

In the computer system 1 according to this embodiment, the virtual volume cache modes are defined by the host 200 for the storage apparatus 100 in the foregoing extent units. Write processing is performed by the host 200 and, if the cache mode designated for the extent is a cache fast mode (CFW), the storage apparatus 100 stores the data in a CFW area in the cache memory and ends the processing. Further, upon storing the record in the extent in the storage medium, the storage apparatus 100 confirms whether CFW has been designated for the extent, and in the case of a CFW-designated extent, assigns a page in the lower storage tier.

As shown in FIG. 1, the storage apparatus 100 comprises at least one storage controller 110 and at least one storage device 120. The storage device 120 is connected to the storage controller 110 via a communication path 130. Note that at least one parity group can be configured by using a plurality of storage devices 120.

The storage controller 110 comprises a processor 111, a main memory 112, a cache memory 113, a host interface (abbreviated to host I/F in the drawings) 114, and a disk interface (abbreviated to disk I/F in the drawings). The storage controller 110 is connected to the data network 102 via the host interface 114 and is connected to the communication path 130 via the disk interface 115.

Further, the storage controller 110 controls data I/Os to and from the storage devices 120 according to commands received from the host 200. By using the cache memory 113 as a buffer, the storage controller 110 exercises control so that the I/O processing is completed in a shorter time than the time for reading and writing from/to the storage devices 120.

The processor 111 functions as an arithmetic processing device and controller and controls the overall operation of the storage apparatus 100. More specifically, various processing is performed for the whole storage apparatus 100 as a result of the processor 111 executing microprograms which are stored in the main memory 112.

The main memory 112 stores programs and arithmetic parameters and the like which are used by the processor 111 and primarily stores programs which are used in the execution by the processor 111 as well as parameters and the like which are suitably varied in this execution. The cache memory 113 is a storage area which temporarily stores data received from the host 200 and data which is read from the storage devices 120.

The storage devices 120 are configured, for example, from a semiconductor memory such as a high-cost, high-performance SSD (Solid State Drive), a disk device such as an FC (Fibre Channel) disk or a SAS (Serial Attached SCSI) disk, and a low-cost, low-performance disk device such as a SATA (Serial AT Attachment) disk.

Figure 2:
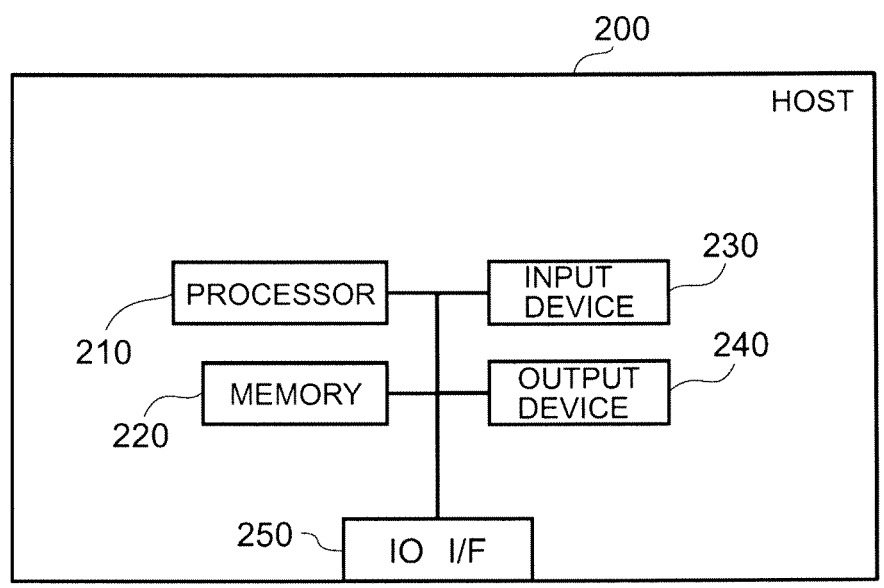
FIG. 2 is a block diagram showing a hardware configuration of a host according to this embodiment.

As shown in FIG. 2, the host 200 comprises a processor 210, a memory 220, an input device 230, and an output device 240. The host 200 is connected to the network 102 via an I/O interface (abbreviated to IF in the drawings) 250. Further, although the host 200 is described in this embodiment by taking a mainframe host in particular by way of example, the host 200 is not limited to this example, rather, the host 200 may also be a personal computer or a workstation, for example.

The processor 210 functions as an arithmetic processing device and controls the operation of the host 200 according to the programs and arithmetic parameters stored in the memory. Further, the I/O device 230 is a keyboard and mainframe device, for example, and the output device 240 is a display or a printer, for example.

The host 200 executes various applications. Further, when a data I/Os is required, the host 200 executes an I/O command and issues a request for I/O command processing to the storage apparatus 100 and receives I/O command processing response data from the storage apparatus 100.

(1-3) Logical Configuration of Storage Apparatus

Figure 3:
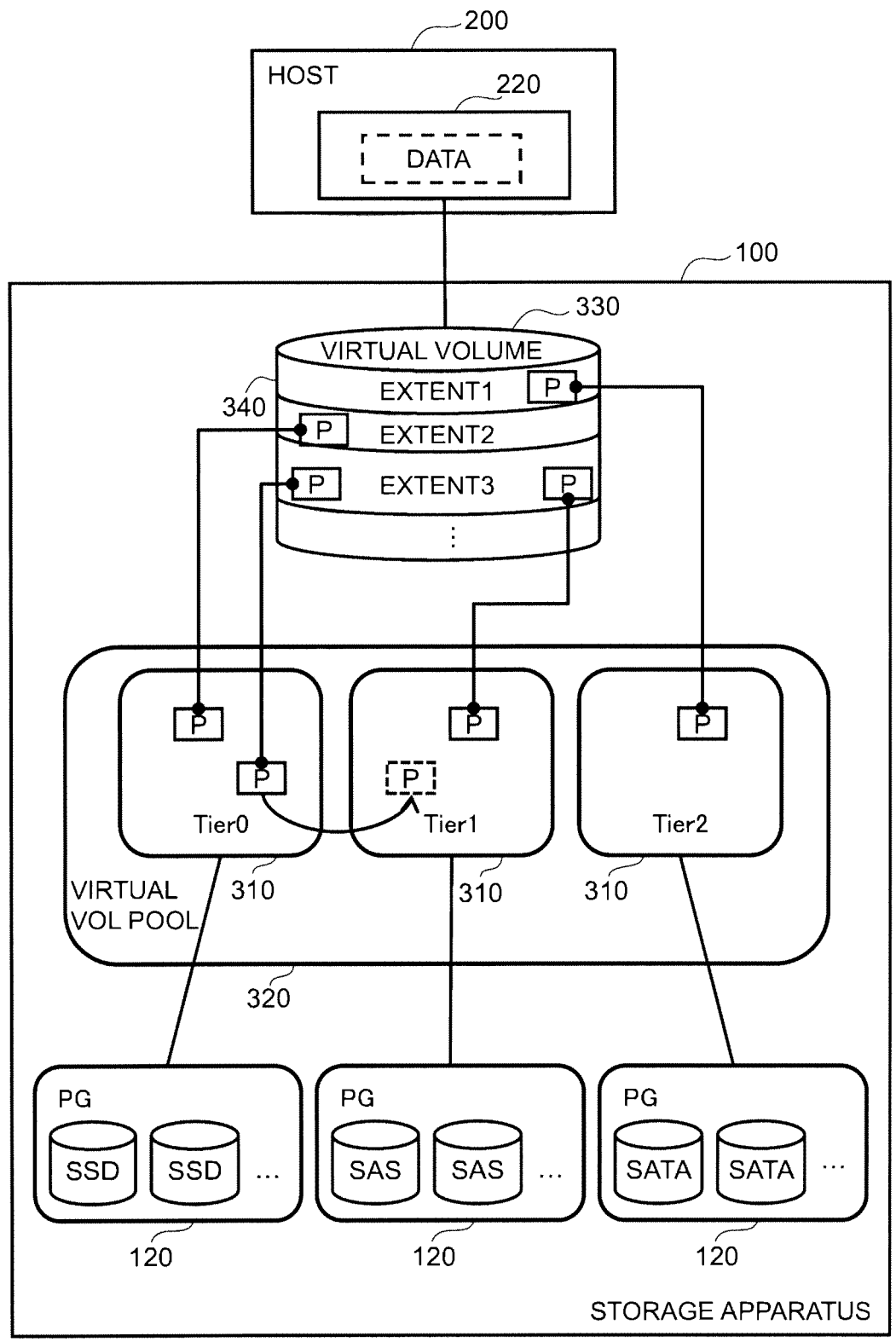
FIG. 3 is a block diagram showing a logical configuration of a storage apparatus according to this embodiment.

The logical configuration of the storage apparatus 100 will be described next. As shown in FIG. 3, in the storage apparatus 100, parity groups PG are defined from at least one storage device 120 of the same type (such as SSD, SAS, or SATA). Further, storage tiers 310 are defined from storage areas provided by storage devices 120 which comprise at least one parity group PG. Furthermore, one virtual volume pool 320 is defined by a plurality of storage tiers 310 of different types.

In the storage apparatus 100 shown in FIG. 3, among each of the storage tiers 310 comprising the virtual volume pool 320, the storage tier which is configured from the storage area provided by an SSD is a high storage tier with the highest reliability and response performance, the storage tier which is configured from the storage area provided by a SAS disk device is an intermediate storage tier with the next highest reliability and response performance, and the storage tier which is configured from the storage area provided by a SATA disk device is a low storage tier with the lowest reliability and response performance.

Furthermore, at least one virtual volume 330 is defined in the storage apparatus 100 and provided to the host 200. Virtual volume numbers which are identifiers are added to each virtual volume 330. The host 200 designates data positions in the virtual volumes 330 which are access targets, in extent units. If the host 200 is a mainframe, the host 200 specifies extents 340 by using the leading and final cylinder numbers and track numbers of areas in the virtual volume 330. Further, data reading and writing by the host 200 from and to the virtual volume 330 are performed in record units in which the virtual volume number, extent identification information, and record position information are designated as addresses.

In addition, if the host 200 is a mainframe, cache modes are designated in extent 340 units. Cache modes include CFW, Bind which affords residency in the cache memory 113, Bypass which does not use the cache memory 113, and Sequential which performs read-ahead on the cache memory 113 using sequential access, and the like.

The virtual volumes 330 are each associated with any one virtual volume pool 320 defined in the storage apparatus 100. Furthermore, if a write request to write to a virtual volume 330 is issued by the host 200 to the storage apparatus 100, in cases where a parity group PG has not been assigned to the record designated in the write request, a parity group PG of the required amount is assigned from the virtual volume pool 320 associated with the virtual volume 330 to the record in units of a predetermined size called pages P.

Here, a page P is a basic unit when a virtual volume 330 is assigned to a parity group PG which forms the virtual volume pool 320. Hereinbelow, a single extent 340 of the virtual volume 330 is assumed to comprise at least one page P. Therefore, in the case of this embodiment, at least one page P is assigned from the virtual volume pool 320 to one extent 340 of the virtual volume 330. Further, designation of the cache mode to the extent 340 is designated for at least one page P which is assigned to the extent 340.

Furthermore, the storage apparatus 100 monitors the frequency of access to page P by the host 200 per unit of time in parallel with the foregoing processing to assign the pages P to the virtual volume 330. The storage apparatus 100 then executes data redisposition processing to re-assign the storage tiers 310, to which the pages P of the virtual volume 330 are assigned, on an as needed basis to other storage tiers 310 at regular or irregular intervals according to the access frequency per unit of time.

Figure 4:
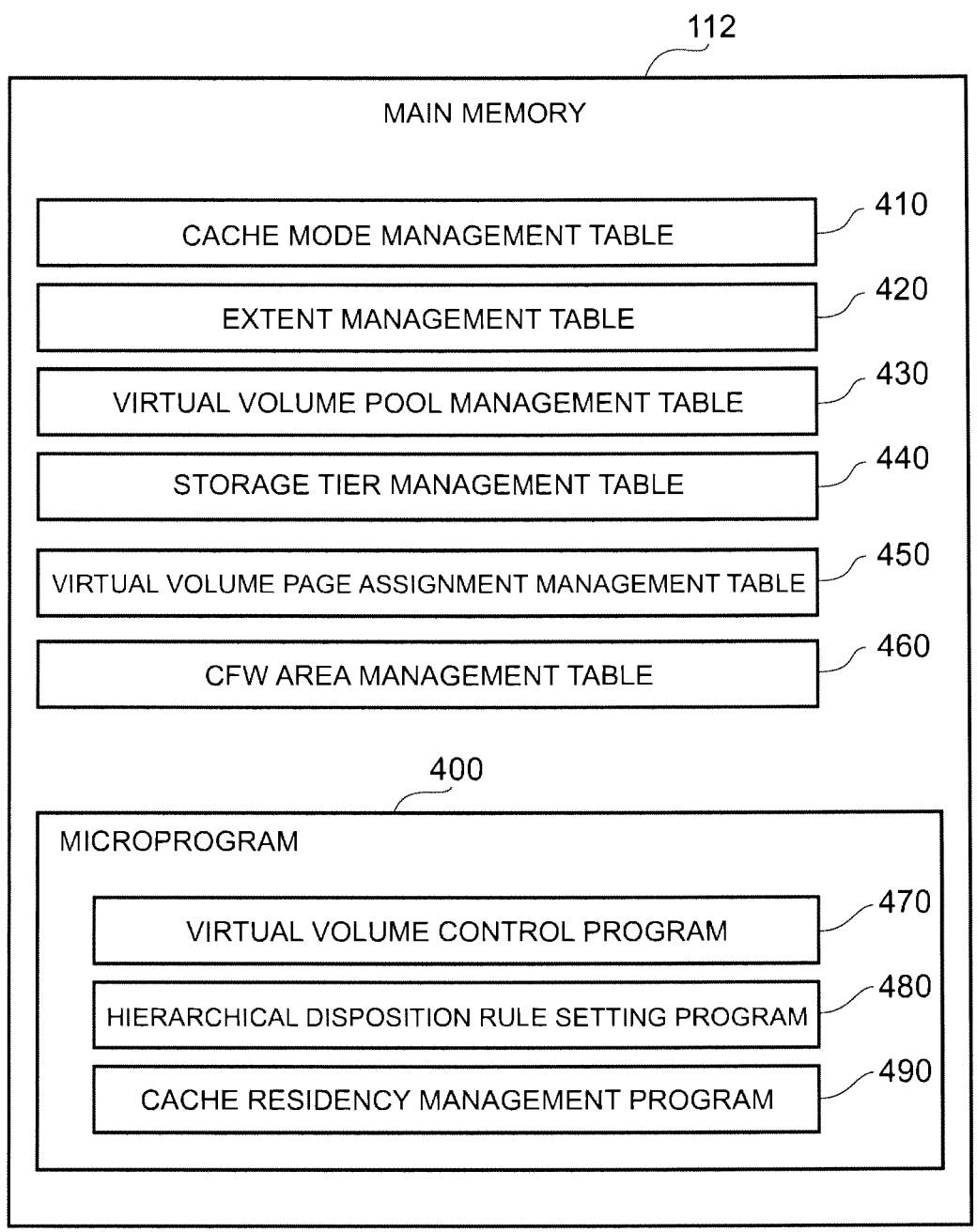
FIG. 4 is a block diagram showing a configuration of a main memory of a storage apparatus according to this embodiment.

FIG. 4 shows management tables and microprograms 400 which are stored in the main memory 112 of the storage apparatus 100. The main memory 112 stores various management tables and microprograms 400. The management tables are a cache mode management table 410, an extent management table 420, a virtual volume pool management table 430, a storage tier management table 440, a virtual volume page assignment management table 450, and a CFW area management table 460. In addition, the microprograms 400 include a virtual volume control program 470, a tier disposition rule configuration program 480, and a cache residency management program 490.

Figure 5:
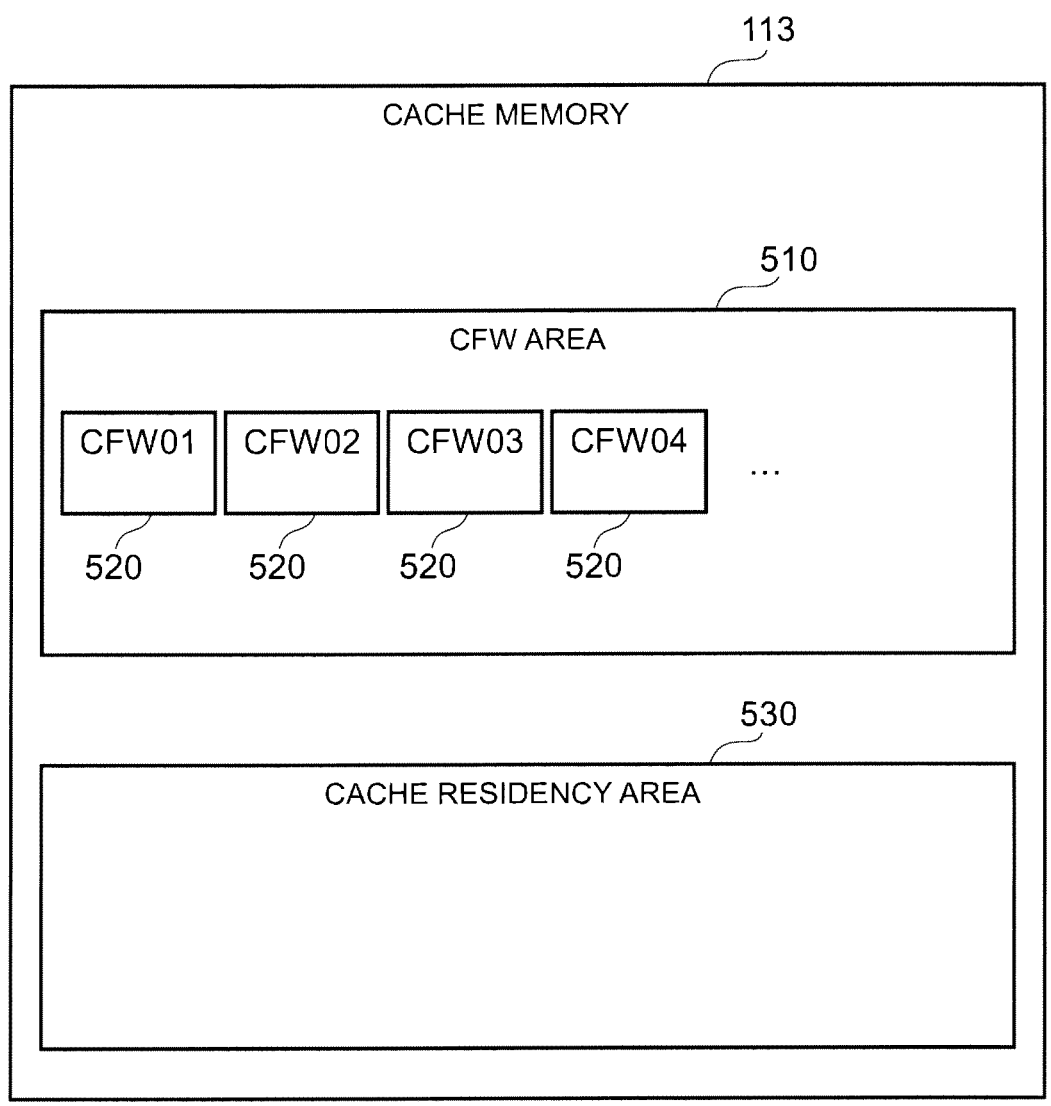
FIG. 5 is a conceptual diagram of a schematic configuration of a cache memory according to this embodiment.

FIG. 5 shows a schematic configuration of the cache memory 113. In addition to an area which is used as a data buffer for the storage devices 120 accessed by the host 200, the cache memory 113 includes a CFW usage area 510 for storing data of the extent 340 designated in the CFW and a cache resident area 530 for storing data of the cache resident extent 340. Further, the CFW usage area 510 comprises a plurality of sections 520, where each section 520 is used in association with each extent defined in the virtual volume 330. Note that, typically, the cache memory 113 comprises a non-volatile memory area in addition to volatile memory.

The hierarchical data management system according to this embodiment which is adopted in the computer system 1 will be described next.

Upon receiving an extent definition command from the host 200, the storage apparatus 100 registers a cache mode which is designated in the targeted extent 340, in the cache mode management table 410.

Here, as shown in FIG. 6, an extent definition command is a command for designating various information in extent units. A command is configured from a command portion 501 which designates a command name, and an operand portion 502 for designating content of the command. For example, a command which defines a cache mode for an extent is a define extent command and a cache mode 505 and an extent range 506 are designated after control information 504. The cache mode 505 may exemplify Cache Fast Write, a DASD Fast Write, Normal, Bypass, Cache Sequential, and the like, for example. Further, a command for discarding data in the cache is a Perf Sub Func command and control information 509 and an extent range 510 are designated after an order code 508. The order code 508 may exemplify Discard Prepare for Read Subsystem Data, Destage Modified Tracks, and Commit, and so on, for example.

The cache mode management table 410 is a table for managing cache modes designated for each extent and, as shown in FIG. 7, is configured from a virtual volume number field 4101, an extent number field 4102, and a cache mode field 4103.

The virtual volume number field 4101 stores an identifier of a target virtual volume 330. The extent number field 4102 stores position information of an extent 340 serving as the target in the virtual volume. The cache mode field 4103 stores the designated cache mode. The cache mode field 4103 registers information such as a CFW or Bind. When there is no cache mode designation, blank information is registered in the cache mode field 4103. Therefore, in the case of FIG. 7, for example, it can be seen that the extents identified as 1 to 3 are defined in the virtual volume VVOL1 such that the cache mode of extent number 1 is CFW, the cache mode of extent number 2 is not designated, and the cache mode of extent number 3 is Bind.

The extent management table 420 is a table for managing correspondence between the extents 340 in the virtual volume 330 and pages and, as shown in FIG. 8, is configured from a virtual volume number field 4201, an extent number field 4202, and a page number field 4203.

The virtual volume number field 4201 stores identifiers of the virtual volume 330 which is the management target. The extent number field 4202 stores position information for target extents 340 in the virtual volume 330. The page number field 4203 stores page numbers which are associated with position information for the extents 340. If an extent 340 is configured from a single page, the extent management information is a single entry. If the extent 340 is configured from a plurality of pages, the extent management information is configured from entries corresponding to multiple pages. Therefore, in the case of FIG. 8, for example, it can be seen that a page 1 is associated with an extent1 of the virtual volume VVOL1, a page 2 is associated with an extent2, and pages 3 and 4 are associated with an extent3.

The virtual volume pool management table 430 is a table for registering parity groups PG which are used as data storage destinations of the virtual volumes pool 320 and for managing whether the storage areas in each of the parity groups PG have been assigned as storage areas of the virtual volume 330.

As shown in FIG. 9, the virtual volume pool management table 430 is configured from a pool number field 4301, a PG number field 4302, an area address field 4303, an assigned state field 4304, and a virtual volume number field 4305.

The pool number field 4301 stores identifiers of each of the virtual volume pools 320 defined in the storage apparatus 100. The PG number field 4302 stores identifiers of the parity group PG. The area address field 4303 stores address information indicating partial areas of the parity groups PG. Here, address information used is partial area section numbers, start address and final address, and information on the start address and area size.

The assigned state field 4304 stores information indicating whether a partial area indicated by information which is stored in the area address field 4303 is assigned to the virtual volume 330. For example, if the area has been assigned to the virtual volume 330, the virtual volume number field 4305 stores identification information for the assigned virtual volume 330. Therefore, in the case of FIG. 9, for example, it can be seen that the area address 1 of a parity group PG01 of a pool 1 has been assigned to a virtual volume VVOL 101.

The storage tier management table 440 is a table for managing storage tiers 310 defined in the storage apparatus 100 and, as shown in FIG. 10, is configured from a pool number field 4401, a PG number field 4402, a media type field 4403, and a storage tier field 4404.

The pool number field 4401 stores identifiers for each of the virtual volume pools 320 defined in the storage apparatus 100. The PG number field 4402 stores identification information for parity groups PG in the storage apparatus 100. The media type field 4403 stores the media types of the parity groups PG (information indicating SSD, SAS, or SATA and so on). The storage tier field 4404 stores storage tier information corresponding to the media types of the parity groups PG in the virtual volume pool 320.

In FIG. 10, storage tier information such as Tier0, Tier1, and Tier2 is supplied in order from high-performance media. If there are two media types in the virtual volume pool 320, the lowest storage tier is Tier1. Therefore, in the case of FIG. 10, for example, the media type of the parity group PG01 of the pool1 is SSD and the storage tier is Tier0.

The virtual volume page assignment management table 450 is a table for managing page assignment to virtual volumes and, as shown in FIG. 11, is configured from a virtual volume number field 4501, a page number field 4502, and an assigned PG number field 4503, and an area address field 4504, and a discard mark field 4504.

The virtual volume number field 4501 stores identifiers of virtual volumes 330 which are management targets. The page number field 4502 stores page numbers in the virtual volume 330. The assigned PG number field 4503 stores identifiers for parity groups PG to which the pages P have been assigned. Here, if a page P has not been assigned to a parity group PG, information indicating nonassignment is stored in the assigned PG number field 4503. The area address field 4504 stores address information indicating partial areas of the parity groups PG. The discard mark field 4504 stores ON information indicating that page areas have been discarded when assignment to the parity group PG is canceled after the page P has been assigned to a parity group PG. Therefore, in the case of FIG. 11, for example, it can be seen that an area address 1 of the parity group PG01 has been assigned to Page1 of the virtual volume VVOL01 and the page area and that the page area has not been discarded.

The CFW area management table 460 is a table for managing the CFW usage area 510 defined in the cache memory 113 and, as shown in FIG. 12, is configured from a CFW area number field 4601, a virtual volume number field 4602, an extent number field 4603, and an update time field 4604.

The CFW area number field 4601 stores information identifying CFW areas 520 of the CFW usage area 510 in the cache memory 113. The virtual volume number field 4602 stores identifiers of the virtual volumes 330 corresponding to the data stored in the CFW areas 520 of the CFW usage area 510. The extent number field 4603 stores extent identification information of the virtual volumes 330 corresponding to the data. Information indicating non-assignment is stored in the virtual volume number field 4602 if a CFW area 520 of the CFW area 113 has not been assigned to any virtual volume 330. The update time field 4604 stores the times when data of the CFW area 520 of the CFW area 113 has been updated. Therefore, in the case of FIG. 12, for example, it can be seen that data which has been stored in the CFW area 0 corresponds to an extent1 of virtual volume 1 and that the update time is T1.

(1-4) Storage Apparatus Operation

The virtual volume control processing of the storage apparatus 100 will be described next. Although the main subject of the promotion processing and demotion processing is an I/O processing unit 301 in the following description, it goes without saying that the processor 111 of the storage apparatus 100 actually executes the processing on the basis of programs thereof.

(1-4-1) Extent Definition Command Processing

Figure 13:
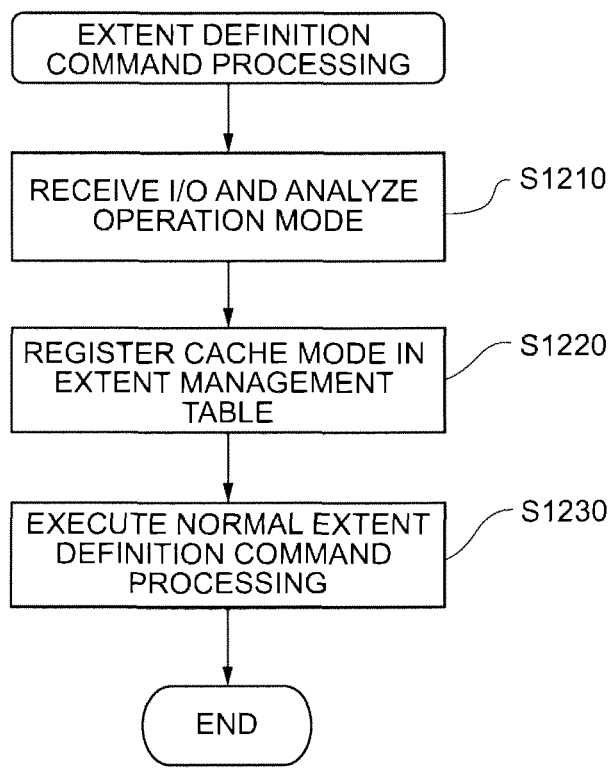
FIG. 13 is a flowchart showing the flow of extent definition processing according to this embodiment.

First, a processing routine of various processing by the virtual volume control program 470 according to this embodiment will be described. FIG. 13 is a flowchart showing a processing routine of extent definition processing. In extent definition processing, a cache which is designated in the extent 340 of the virtual volume is registered in the cache mode management table 410.

The storage apparatus 100 receives a command requesting I/O processing from the host 200 and, if the command is a command defining the virtual volume extent, the storage apparatus 100 starts the extent definition processing described below. For example, the command may be a define extent channel command or a prefix device command or the like which is sent from a mainframe host 200.

As shown in FIG. 13, the virtual volume control program 470 receives I/Os from the host 200 and analyzes the operation mode designated by the command thus sent (S1210). More specifically, the virtual volume control program 470 acquires targeted virtual volume information, extent information or cache mode information or the like based from the I/O and analyzed operation mode.

The virtual volume control program 470 subsequently performs detection of an entry in the cache mode management table 410 which corresponds to the virtual volume information and extent information acquired in step S1210 and stores information indicating the cache mode acquired in step S1210 in the entry (S1220). Here, if an entry which corresponds to the acquired virtual volume information and extent information is not detected by the virtual volume control program 470, the virtual volume control program 470 adds a new entry and associates virtual volume information and extent information thereof with information indicating the cache mode, and stores this information in the cache mode management table 410.

Further, the virtual volume control program 470 executes normal extent definition processing (S1230). More specifically, the virtual volume control program 470 stores data for the cache mode based on a command sent and transmits a reception completion notification to the host 200.

As a result of the foregoing extent definition command processing, the virtual volume control program 470 of the storage apparatus 100 registers the cache mode designated in the extent 340 of the virtual volume 330 in the cache mode management table 410.

(1-4-2) Write Command Processing

A processing routine for write command processing when a command to write data to the virtual volume 330 is received from the host 200 is illustrated next.

Figure 14:
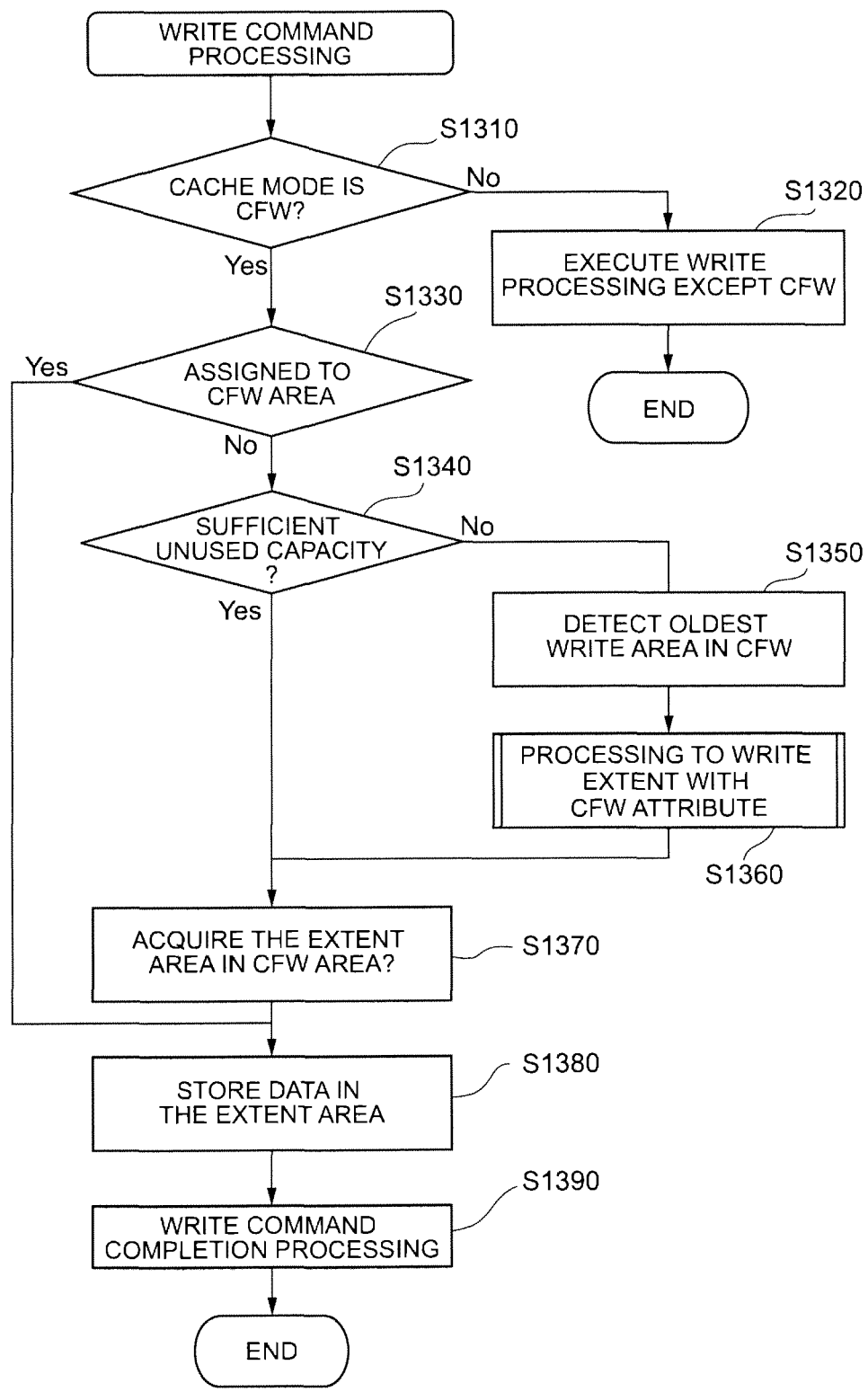
FIG. 14 is a flowchart showing the flow of write command processing according to this embodiment.

As shown in FIG. 14, the virtual volume control program 470 first determines whether the cache mode of an extent 340 containing a write destination record is CFW (step S1310). More specifically, the virtual volume control program 470 refers to the cache mode management table 410 to determine whether information indicating the CFW is stored in the cache mode field 4103 of the write destination extent.

If it is determined in step S1310 that the cache mode of the write target extent is not CFW, the virtual volume control program 470 executes write processing other than CFW (S1320).

If, on the other hand, it is determined in step S1310 that the cache mode of the write target extent is CFW, the virtual volume control program 470 determines that an extent 340 containing a write target record has been assigned to the CFW usage area 510 in the cache memory 113 (S1330). More specifically, the virtual volume control program 470 refers to the CFW area management table 460 to confirm whether an entry which corresponds to the write target extent has been stored.

If it is determined in step S1330 that the CFW usage area 510 has been assigned to the write target extent, the virtual volume control program 470 advances to step S1380. If, on the other hand, it is determined in step S1330 that the CFW usage area 510 has not been assigned to the write target extent, the virtual volume control program 470 determines whether there is sufficient unused capacity for storing the extent 340 in the CFW usage area 510 in the cache memory 113 (S1340).

If it is determined in step S1340 that there is insufficient space in the CFW usage area 510 in the cache memory 113, the virtual volume control program 470 detects the extent which was updated at the oldest time from among the CFW areas 520 of the CFW usage area 510 (S1350). More specifically, the virtual volume control program 470 refers to the CFW area management table 460 to compare the update times of the CFW areas 520 of all the entries in this table and detect the extent which was updated at the oldest time.

The virtual volume control program 470 subsequently writes the extent 340 with the oldest write to the parity group PG and sets the corresponding CFW area in the CFW area management table 460 as unassigned (S1360). The processing for setting the CFW area to unassigned in step S1360 will be described in detail subsequently.

If it is determined in step S1340 that there is sufficient space in the CFW usage area 510 in the cache memory 113 or after unused area for storing the data of the extent 340 in the CFW area 520 has been prepared in S1360, the virtual volume control program 470 uses the CFW area management table 460 to acquire a CFW area for the extent in the CFW area 520 (S1370). In step S1370, the virtual volume control program 470 registers virtual volume information and extent information in an entry specifying the CFW area 520 for the extent in the CFW area management table 460.

Further, the virtual volume control program 470 stores data of the extent 340 in the partial area 1380 acquired in step S1370 (S1380). More specifically, the virtual volume control program 470 registers update time information in an entry specifying the CFW area 520 for the extent 340 of the CFW area management table 460. Finally, the virtual volume control program 470 executes write completion processing (step S1390).

CFW area data removal processing in step S1360 will be described next.

Figure 15:
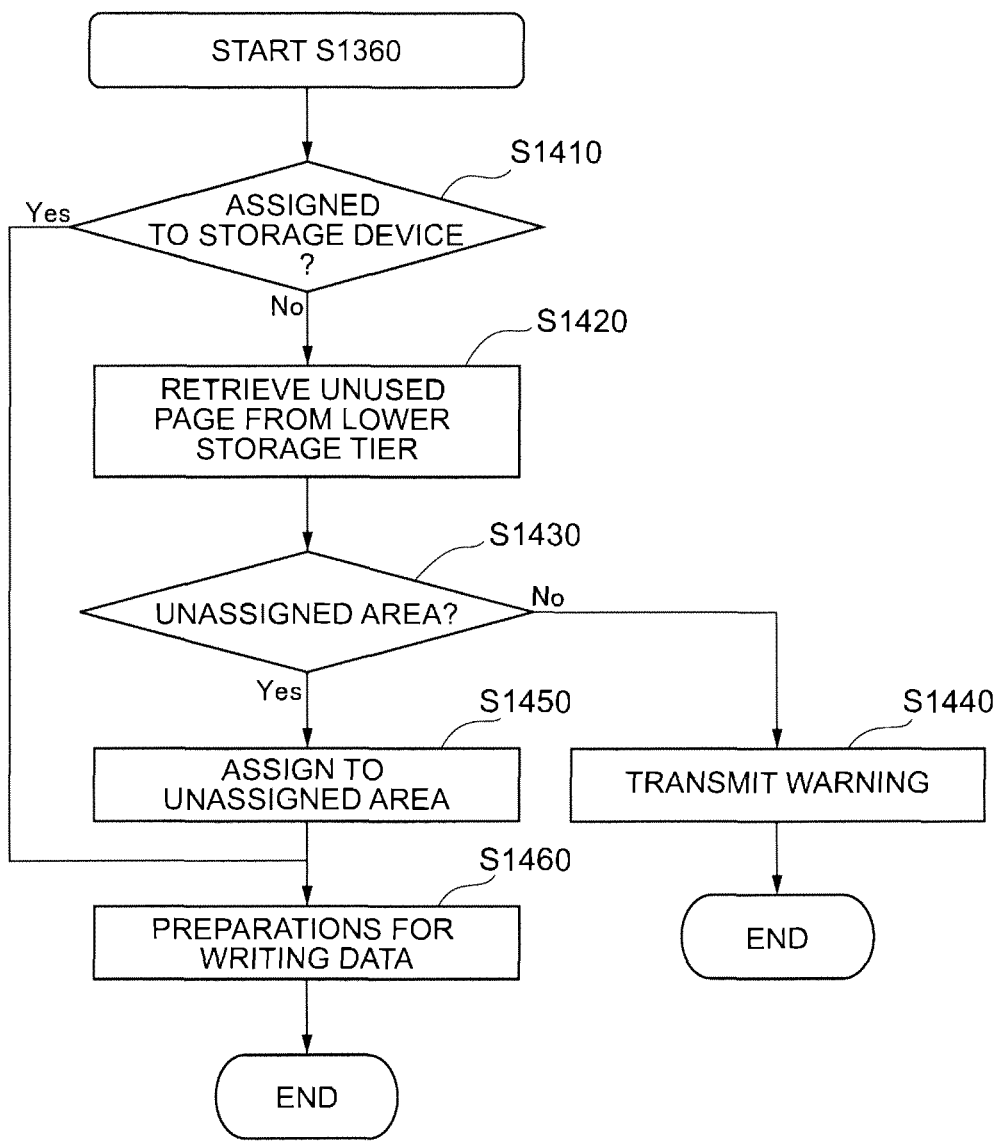
FIG. 15 is a flowchart showing the flow of write command processing according to this embodiment.

As shown in FIG. 15, the virtual volume control program 470 first determines whether the page P of the extent 340 has been assigned to a parity group PG (S1410). More specifically, the virtual volume control program 470 refers to the extent management table 420 to acquire page identification information which corresponds to the extent 340. Further, the virtual volume control program 470 refers to the virtual volume page assignment management table 450 to check whether the page P has been assigned to a parity group PG in the virtual volume pool 320.

If it is determined in step S1410 that the page P of the extent 340 has not been assigned to a parity group PG, the virtual volume control program 470 detects an unused page from the lower storage tier 310 (S1420). More specifically, the virtual volume control program 470 uses the storage tier management table 440 to specify the parity group PG of the lower storage tier 310. In addition, the virtual volume control program 470 uses the virtual volume pool management table 430 to acquire an unused area in the parity group PG, that is, an unassigned area address. Note that the virtual volume pool 320 to which the page P of the virtual volume 330 is assigned is determined beforehand.

Furthermore, the virtual volume control program 470 determines whether an unassigned area has been detected (S1430).

If it is determined in step S1430 that there is no unassigned area, the virtual volume control program 470 issues a reply to the host 200 to the effect that data writing has failed (S1440).

If, on the other hand, it is determined in step S1430 that an unassigned area exists, the virtual volume control program 470 assigns the extent 340 to the unassigned area, registers parity group PG information and area address information in the virtual volume page assignment management table 450 and registers assigned information in the corresponding area address entry in the virtual volume pool management table 430 (S1450).

The virtual volume control program 470 subsequently stores the data of the CFW area 520 storing the extent 340 in the area which has been assigned to the parity group PG, deletes information in the extent number field 1130 from the entry corresponding to the relevant extent 340 in the CFW area management table 460 and stores non-assignment information in the virtual volume number field 1120 (step S1460).

As a result of the foregoing processing, in order to store the extent 340 for which the cache mode is CFW in the CFW area 520 of the CFW usage area 510, the data of the oldest CFW area 520 in the CFW area 510 is removed from the lower storage tier 310. Accordingly, the extent 340 for which the cache mode is CFW is assigned to a parity group PG of the lower tier so that the data temporarily used by the host 200 in the cache memory 113 does not occupy the upper tier. As a result, it is possible to avoid a situation where there is insufficient space in the upper tier which is for assignment of extents 340 for which high performance is expected.

(1-4-3) Cache Area Discard Processing

In this embodiment, the data storage space in the media is released due to the cache area discard processing which discards data of the CFW areas 520 in the CFW usage area 510 storing temporary data in the cache memory 113. Cache area discard processing will be described in detail hereinbelow.

The cache area discard processing is processing If the host 200 is a mainframe, the cache area discard processing is processing which is requested from the storage apparatus 100 by means of a perform subsystem function command. More specifically, the virtual volume control program 470 uses information identifying the extents 340 to discard the data of the extents 340 from the CFW usage area 510.

Figure 16:
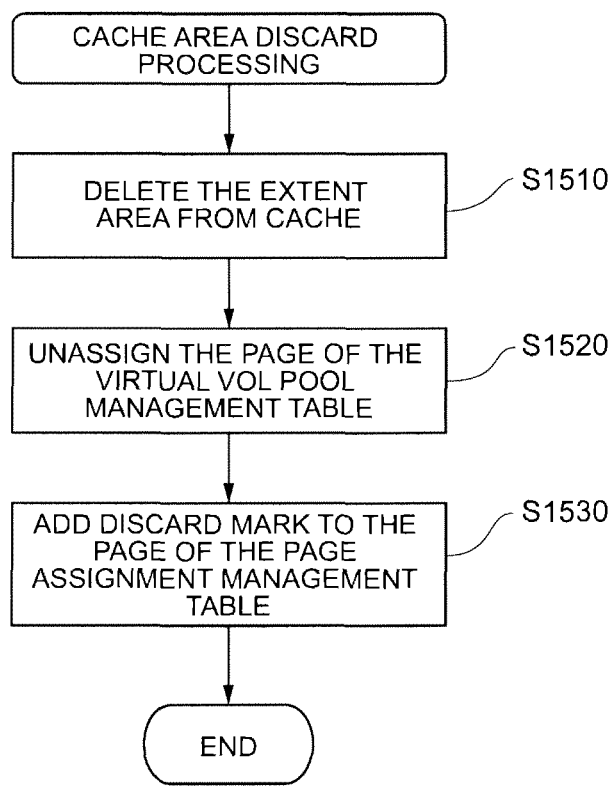
FIG. 16 is a flowchart showing the flow of cache area discard processing according to this embodiment.

As shown in FIG. 16, the virtual volume control program 470 first discards the extent 340 designated by the host 200 for discarding data of the cache area from the CFW area 520 (S1510). More specifically, the virtual volume control program 470 specifies the CFW area 520 where the corresponding extent 340 is stored by using the CFW area management table 460. In addition, the virtual volume control program 470 deletes information in the extent number field 1130 of the entry comprising the specified CFW area 520 and stores information indicating non-assignment in the virtual volume number field 1120.

Thereafter, [the virtual volume control program 470] stores non-assignment information in an assigned state field 840 of the entry where the area pertaining to the extent 340 discarded in step S1510 from the virtual volume pool management table 430 is registered (S1520). At this time, the virtual volume control program 470 uses the extent management table 420 to acquire a page number corresponding to the discarded extent 340 and subsequently uses the virtual volume page assignment management table 450 to specify the parity group PG where the corresponding page number is stored and the area address therein.

Further, the virtual volume control program 470 enters ON in the discard mark field 1050 of the entry where the foregoing specified area address is registered in the virtual volume page assignment management table 450 (S1530).

As a result of the cache area discard processing, the storage area where the extent 340 discarded from the CFW usage area 510 is stored is unassigned and in the foregoing write processing, the storage area can be assigned to another extent 340.

(1-4-4) Read Processing

Read processing will be described next. Read processing is processing to respond to a request to read data which is stored in the storage apparatus 100, from the host 200.

Figure 17:
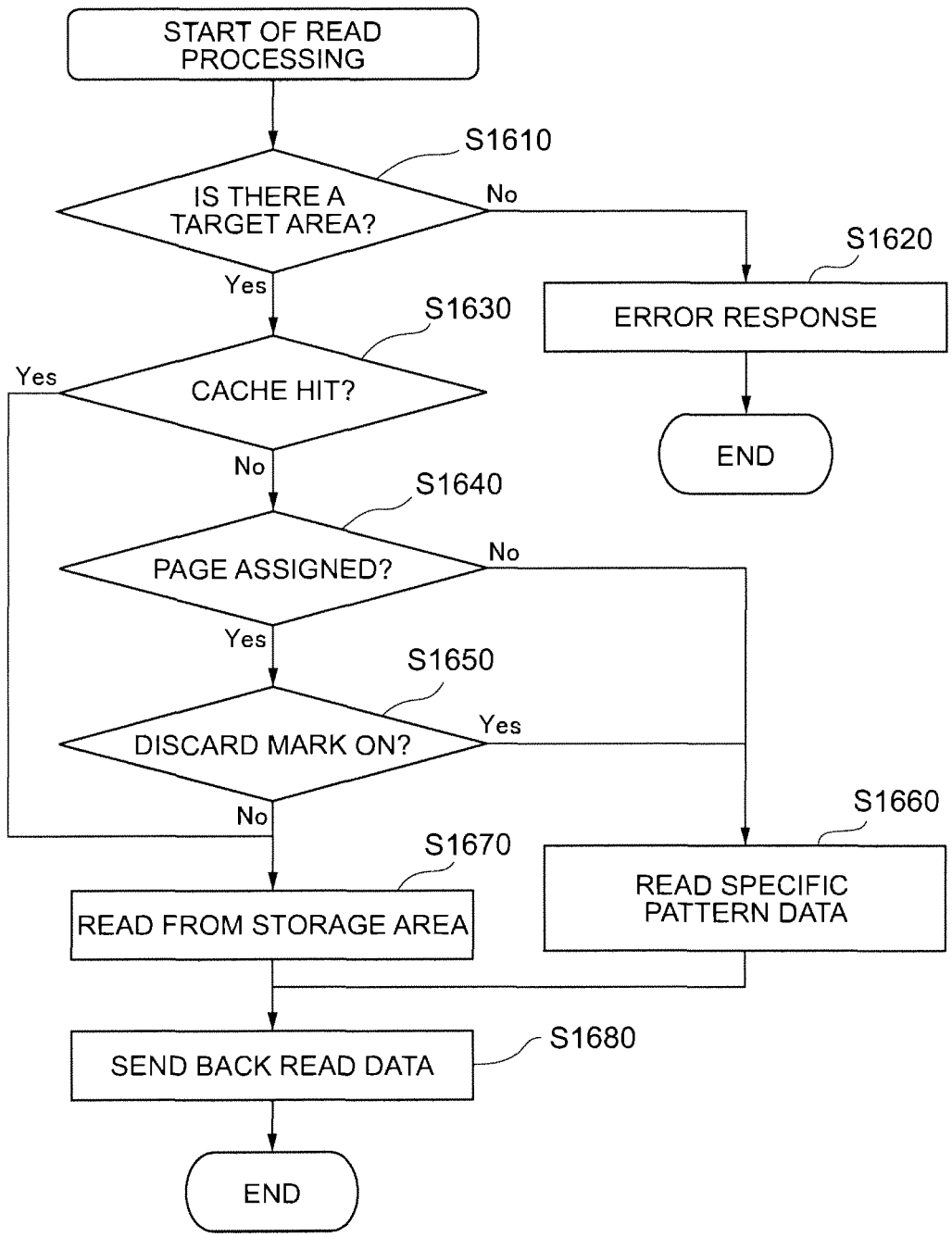
FIG. 17 is a flowchart showing the flow of read processing according to this embodiment.

As shown in FIG. 17, the virtual volume control program 470 first determines whether the area in which the reading is requested by the host 200 exists in the storage apparatus 100 (S1610).

If it is determined in step S1610 that there is no corresponding data in the storage apparatus 100, the virtual volume control program 470 sends back an error to the host 200 (S1620).

If, on the other hand, it is determined in step S1610 that there is corresponding data in the storage apparatus 100, the virtual volume control program 470 determines whether there is a cache hit, that is, whether corresponding data exists in the cache memory 113 (S1630).

If it is determined in step S1630 that there is corresponding data in the cache memory 113, the virtual volume control program 470 advances to step S1670.

If, on the other hand, it is determined that there is no corresponding data in the cache memory 113, the virtual volume control program 470 determines whether an extent 340 containing the corresponding data has been assigned to the parity group PG (S1640). More specifically, the virtual volume control program 470 uses the CFW area management table 460 and the virtual volume page assignment management table 450 to check where the extent 340 which contains the corresponding data has been assigned.

If an entry in which a page P of the corresponding extent 340 is registered is found in the virtual volume page assignment management table 450, the virtual volume control program 470 subsequently determines whether ON is registered in the discard mark field 1050 of the entry (S1650).

In cases where it is determined in step S1640 that a page P has not been assigned or where it is determined in step S1660 that a discard mark has been added to the page P, the virtual volume control program 470 reads the data of a specific pattern and configures the data as substitute data (S1660). Note that the data of the specific pattern is, for example, all-zero data, or the like.

If, on the other hand, it is determined in step S1640 that the page P has been assigned to a parity group PG, the virtual volume control program 470 reads data of the page P from the corresponding storage area (S1670).

Further, the virtual volume control program 470 sends back the data thus read to the host 200 (S1680).

As a result of the foregoing read processing, data can be prepared in response to a read request from the host 200 even for pages P which have been discarded from the CFW usage area 510 and this data can be sent back to the host 200. Accordingly, the media capacity can be minimized as a result of the storage apparatus 100 recognizing temporary data which is unnecessary and releasing storage area of a parity group PG which is no longer required.

(1-4-5) Redisposition Processing

In this embodiment, in cases where data of CFW mode has been stored in a storage device 120 in the redisposition processing of hierarchical data management, the storage tier storing the data is changed. Redisposition processing will be described in detail hereinbelow.

Redisposition processing is executed at regular or irregular intervals by the virtual volume control program 470.

Figure 18:
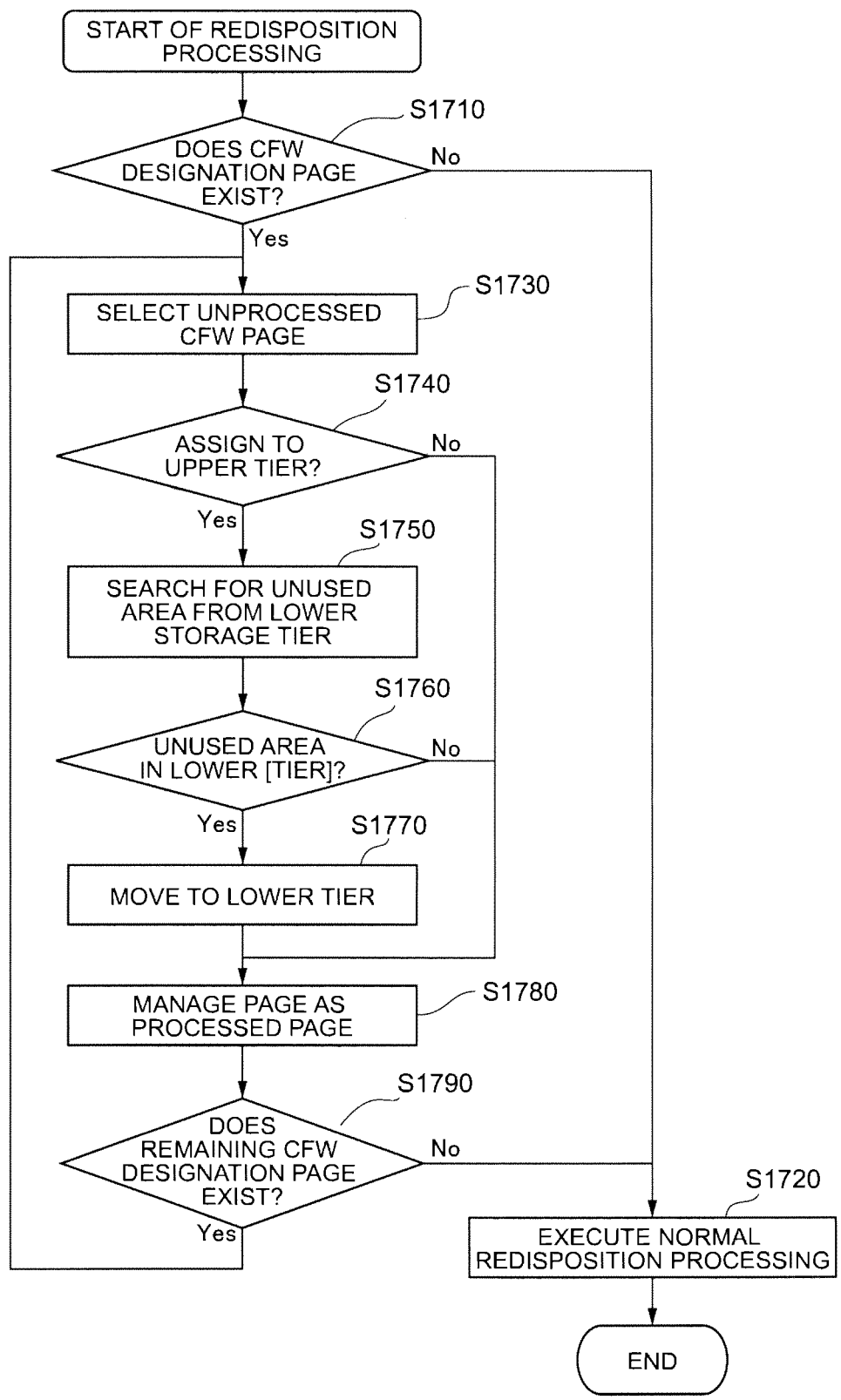
FIG. 18 is a flowchart showing the flow of redisposition processing according to this embodiment.

As shown in FIG. 18, the virtual volume control program 470 first determines whether there is a page P which is designated for CFW among all the assigned pages P (S1710). More specifically, the virtual volume control program 470 uses the extent management table 420 to confirm which extent 340 the page P registered in the virtual volume page assignment management table 450 relates to. Further, the virtual volume control program 470 uses the cache mode management table 410 to acquire the cache mode of the extent 340 and determine whether the cache mode is CFW.

If it is determined in step S1710 that there is no page P for which the cache mode has been designated as CFW, the virtual volume control program 470 advances to step S1720 and executes normal redisposition processing.

If, on the other hand, it is determined in step S1710 that there is a page P for which the cache mode is designated as CFW, the virtual volume control program 470 selects the page P with the CFW designation for which the redisposition processing has not been executed (S1730).

Furthermore, the virtual volume control program 470 determines whether or not the storage tier 310 to which the page P has been assigned is the upper tier (S1740). More specifically, the virtual volume control program 470 uses the virtual volume page assignment management table 450 to acquire [information on] which parity group PG the corresponding page P has been assigned to and uses the storage tier management table 440 to determine whether the storage tier 310 of the assigned parity group PG is the lower tier.

If it is determined in step S1740 that the page P is stored in the lower tier, the virtual volume control program 470 advances to step S1780.

If, on the other hand, it is determined in step S1740 that the page P has been assigned to the upper tier, the virtual volume control program 470 detects an unused area from the lower storage tier 310 (S1750). More specifically, the virtual volume control program 470 uses the storage tier management table 440 to obtain the parity group PG which belongs to the lower tier with the pool number to which the page P belongs. Further, the virtual volume control program 470 uses the virtual volume pool management table 430 to acquire an unassigned area from the parity group PG thus obtained. If it is not possible to detect a lower unused area in step S1750 (S1760), the virtual volume control program 470 advances to step S1780.

The virtual volume control program 470 subsequently assigns the page P to the unused area of the lower storage tier 310 detected in step S1750 (S1770). In step S1770, the virtual volume control program 470 stores assigned information and the target virtual volume number in the entry where the corresponding area in the virtual volume pool management table 430 is registered and copies the data of the page P to the assigned area. Furthermore, the virtual volume control program 470 stores non-assignment information in the entry where the area assigned to the upper tier of the virtual volume pool management table 430 is registered and deletes the virtual volume information. Further, the virtual volume control program 470 changes the assigned parity group PG information to unassigned from the entry where the page P of the virtual volume page assignment management table 450 is registered to unassigned, deletes the area address information, and releases the area in the upper tier.

The virtual volume control program 470 then manages the page P as a page which has undergone redisposition processing (S1780).

The virtual volume control program 470 subsequently determines whether a page P with a CFW designation which has not undergone redisposition processing remains (S1790).

If it is determined in step S1790 that an unprocessed page remains, the virtual volume control program 470 repeats the processing of step S1730 and subsequent steps. If, on the other hand, it is determined in step S1790 that an unprocessed page does not remain, the virtual volume control program 470 advances to step S1720 and executes normal redisposition processing.

As a result of the foregoing processing, the virtual volume control program 470 is able to redispose the storage tier 310 to which a CFW-designated page has been assigned from the upper tier to the lower tier. Accordingly, if the extent 340 stored in the storage device is a CFW target, the storage apparatus 100 recognizes that the host 200 temporarily uses the extent 340 and migrates the extent storage area to the lower tier. As a result, the media of the upper tier can be assigned to the extent used by the host 200 which expects high-performance access.

(1-5) Advantageous Effects of Embodiment

As described hereinabove, with this embodiment, if there is an I/O request from the host 200, the storage tier of the storage area which is assigned to a virtual volume which stores data corresponding to the I/O request is determined according to the mode of writing to the cache memory 113. As a result, when data which is written only to the cache memory 113 is stored on a storage medium, the storage capacity of the storage medium can be used effectively by rapidly placing the data in a suitable tier.

(2) Second Embodiment (2-1) Overview of the Embodiment

In the first embodiment, cache modes were designated by the host 200 and tier redisposition processing was executed on the basis of the cache modes. In this embodiment, the cache modes and the tier disposition rules are configured by the storage administrator, and the storage tiers 310 of the extents 340 for which the cache modes are designated are determined according to set rules. Configurations which differ from the first embodiment will be described in particular detail hereinbelow and a detailed description of configurations which are the same as those of the first embodiment will be omitted.

(2-2) Computer System Configuration

Figure 19:
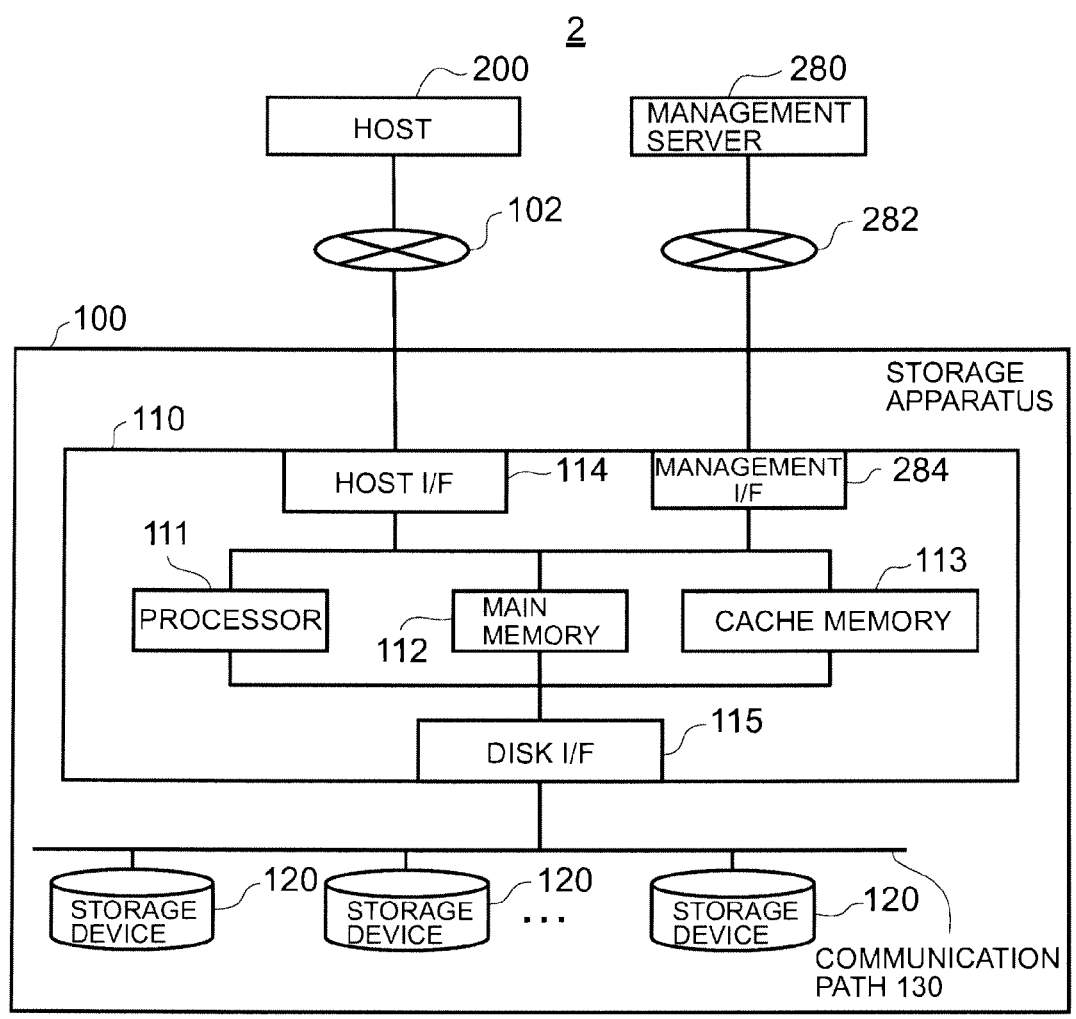
FIG. 19 is a block diagram showing the configuration of a computer system according to a second embodiment.

As shown in FIG. 19, the computer system 1 comprises a management server 280 and a management I/F 284 in addition to at least one host 200 and the network 102. Further, the management I/F 284 is provided in the storage apparatus 100 and the management I/F 284 of the storage apparatus 100 is connected to the management server 280 via a management network 281.

The hardware configurations of the storage apparatus 100 and the host 200 are the same as those of the first embodiment and hence a detailed description is omitted. Further, the hardware configuration of the management server 280 is substantially the same as the hardware configuration of the host 200 except that, in addition to the processor, memory, input devices and output devices, a management I/F for connecting to the management network 281 has been added.

(2-3) Logical Configuration of Storage Apparatus

The method of setting the tier disposition rules of the management server 280 will be described next. Hereinafter, a detailed description of the logical configuration which is the same as that of the first embodiment is omitted, and the method of setting the tier disposition rules which differs from that of the first embodiment will be described in particular detail. The setting of the tier disposition rules is performed by means of administrator inputs via the display screen of the management server 280.

Figure 20:
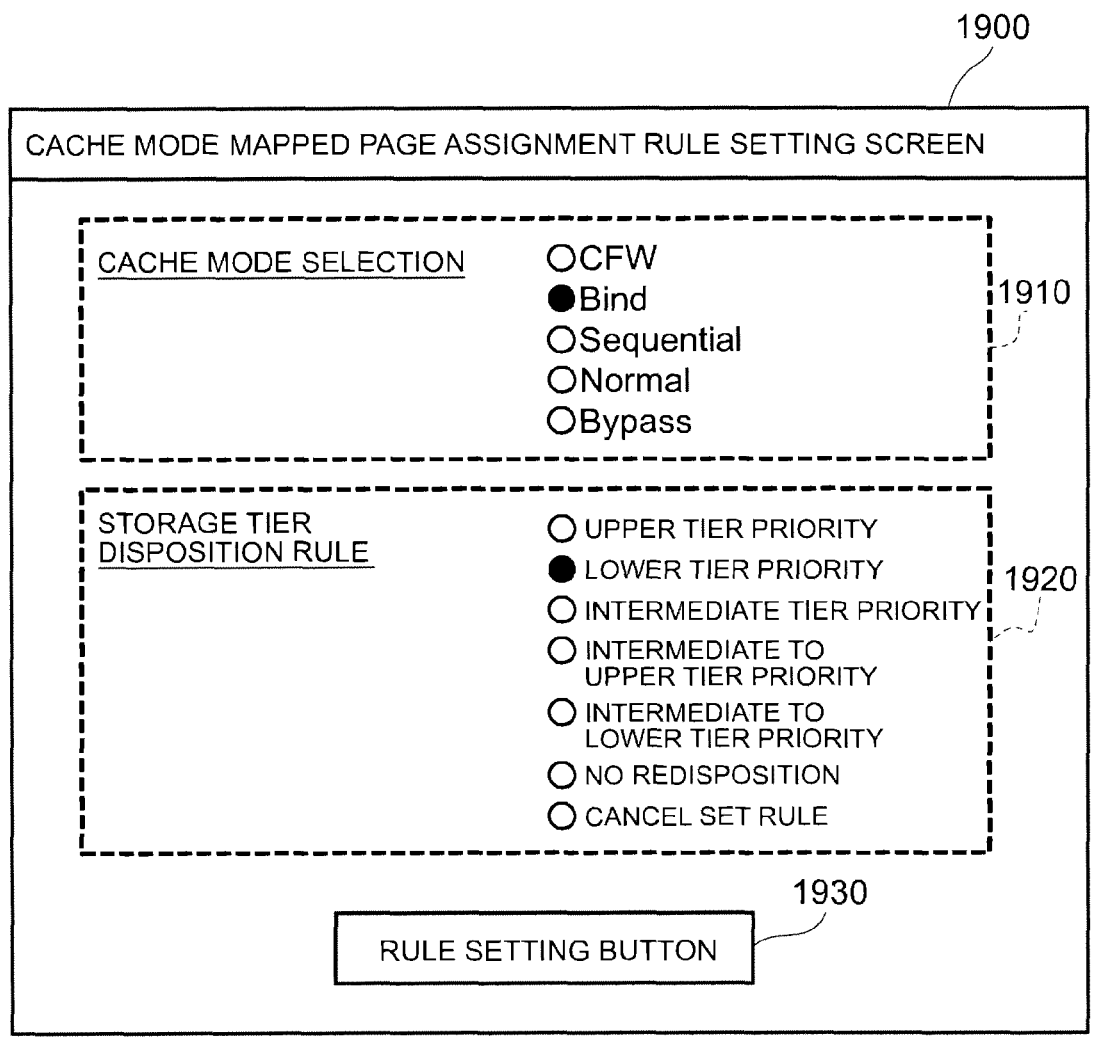
FIG. 20 is a conceptual diagram showing a tier disposition rule setting screen according to this embodiment.

First, the screen for setting the tier disposition rules which are displayed on the display screen of the management server 280 will be described. As shown in FIG. 20, the display screen of the management server 280 displays an assignment rule setting screen 1900 for setting the tier disposition rules for defining which storage tiers 310 are prioritized for the disposition of pages P designated by the cache modes. The cache mode mapped page assignment rule setting screen 1900 is a GUI screen which enables the system administrator to define the cache mode and the storage tier 310 given assignment priority, and is configured from a cache mode selection field 1910, a storage tier disposition rule field 1920, and a rule setting button 1930.

The cache mode selection field 1910 displays the cache modes such as CFW or Bind which the storage controller 110 prepares as attributes of the cache memory 113. One cache mode is selected from the displayed modes as a result of an input from the system administrator.

The storage tier disposition rule field 1920 displays a plurality of storage tier disposition rules. As a result of an input by the system administrator, one storage tier disposition rule is selected from a plurality of storage tier disposition rules, such as, to prioritize assignment, from a particular tier, of a page P designated in the cache mode selected in the cache mode selection field 1910, or to not perform redisposition, or to cancel a previously set rule.

The rule setting button 1930 is a button for associating the cache mode selected in the cache mode selection field 1910 with a priority tier selected in the storage tier disposition rule field 1920 and stores the associated cache mode and priority tier in the main memory 112.

The cache mode mapped tier disposition rule management table 2000 which is stored in the main memory of the storage apparatus 100 will be described next. The tier disposition rule management table 2000 is a table for managing the tier disposition rules corresponding to the cache modes based on inputs by the system administrator and, as shown in FIG. 21, is configured from a cache mode field 2010, a default field 2020, and a set rule field 2030.

The cache mode field 2010 stores the types of cache modes which are the same as those displayed in the cache mode selection field 1910 of the assignment rule setting screen 1900. The default field 2020 stores information which, when a tier disposition rule for a cache mode has not been set, enables the tier disposition rule setting program 480 to set in which storage tier 310 the page P for which the cache mode has been designated should be disposed as a priority. The set rule field 2030 stores the storage tier disposition rule which has been set via the rule setting screen 1900.

For example, when the rule setting button 1930 is pressed by the system administrator, the entry where the cache mode selected in the cache mode selection field 1910 is registered in the storage tier rule management table 2000 is updated.

Therefore, in the example of FIG. 21, although, for pages P for which the cache mode is sequential, the default setting gives priority to the intermediate [tier] to the lower tier, due to an input by the system administrator, the rule to prioritize the lower tier has been set.

Here, although a column has not been especially provided for a case where there is no cache mode designation, a column for a case where there is no cache mode designation may be provided and the set rule may be made variable.

(2-4) Operation of Storage Apparatus

The page assignment processing which is executed by the tier disposition rule setting program 480 of the storage apparatus 100 will be described next.

(2-4-1) Page Assignment Processing Using Tier Disposition Rules

Page assignment processing which uses tier disposition rules is processing which uses the information of the tier disposition rule management table 2000 to determine the parity groups PG storing the pages P of the extents 340.

Figure 22:
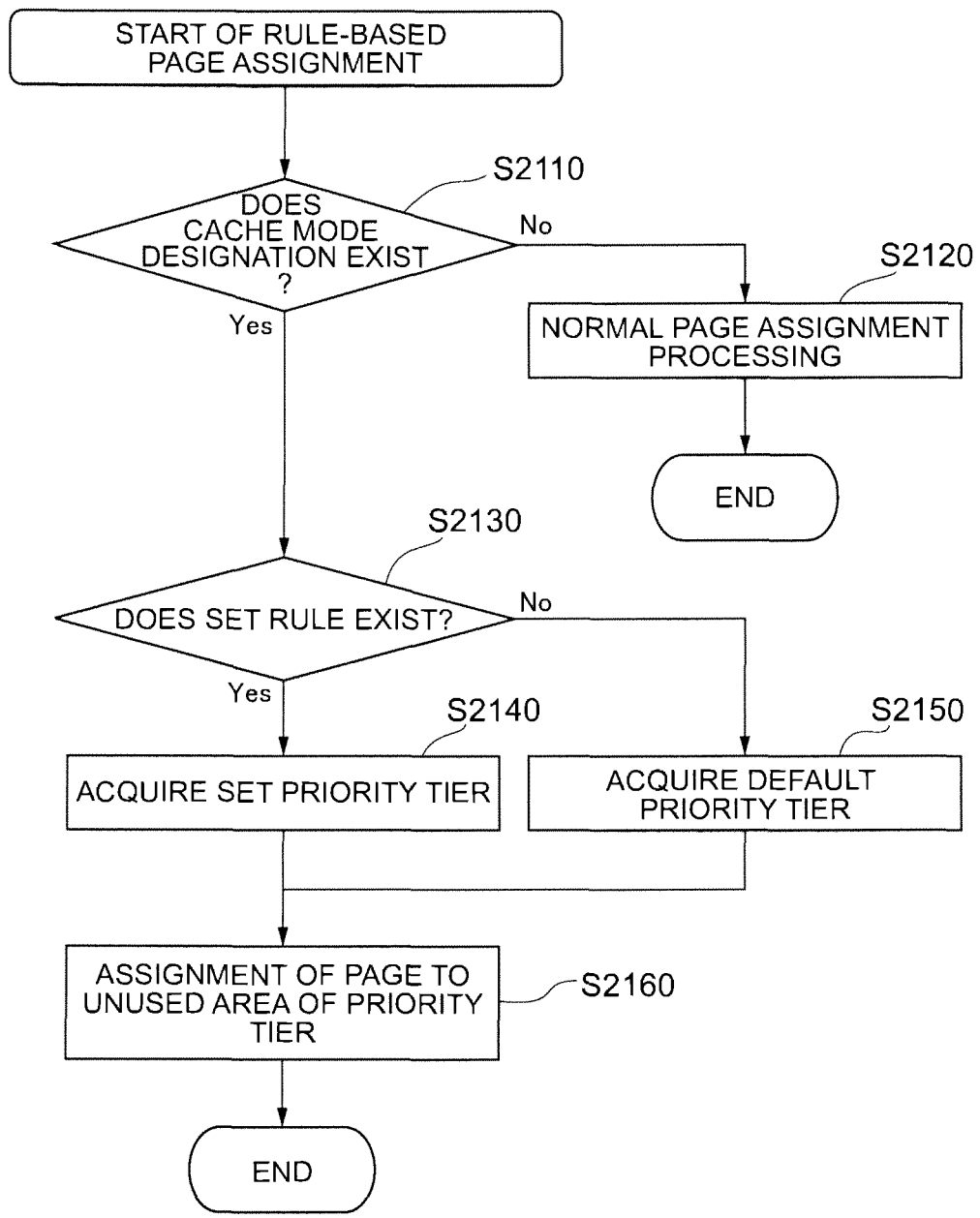
FIG. 22 is a flowchart showing the flow of page assignment processing which uses tier disposition rules according to this embodiment.

As shown in FIG. 22, the tier disposition rule setting program 480 first determines whether a cache mode has been designated for the page P (S2110). More specifically, the tier disposition rule setting program 480 uses the cache mode management table 410 to acquire the cache mode of the extent 340 comprising the page P.

If it is determined in step S2110 that a cache mode has not been designated, the tier disposition rule setting program 480 advances to step S2120 and executes normal page assignment processing.

If it is determined in step S2110 that a cache mode has been designated for the page P, the tier disposition rule setting program 480 determines whether a storage tier disposition rule has been set for the cache mode (S2130). More specifically, the tier disposition rule setting program 480 uses the tier disposition rule management table 2000 to check whether a rule is stored in the set rule field 2130 in the tier disposition rule management table 2000 of the entry where the cache mode is registered.

If it is determined in step S2130 that a rule has been set, the tier disposition rule setting program 480 advances to step S2140 to determine the tier for assignment based on the information stored in the set rule field 2130 in the tier disposition rule management table 2000. If, on the other hand, it is determined in step S2130 that a rule has not been set, the virtual volume control program 470 advances to step S2150 to determine the tier for assignment based on the information designated in the default field 2020 of the tier disposition rule management table 2000.

Further, the tier disposition rule setting program 480 assigns a page P to an unused area of the assignment tier (S2160). More specifically, the tier disposition rule setting program 480 uses the storage tier management table 440 to determine the parity group PG matching the tier for assignment, in the virtual volume pool 320 to which the virtual volume 330 containing the page P is assigned. Furthermore, the tier disposition rule setting program 480 stores assignment information in the virtual volume pool management table 430 and the virtual volume page assignment management table 450.

As a result of the page assignment processing, the page P of the virtual volume 330 can be assigned to a storage tier 310 in accordance with the tier disposition rule input by the system administrator.

(2-4-2) Redisposition Processing Using Tier Disposition Rules

A redisposition processing routine which uses tier disposition rules input by the system administrator will be described next. As with the first embodiment, so too with this embodiment, a page P which has been assigned to a predetermined tier by the page assignment processing is redisposed between storage tiers 310. For example, if the cache mode designated for the page P differs from the cache mode designated with the timing of the previous redisposition, the assignment is changed according to the rule set for the new cache mode. Further, the assignment is changed also in a case where the cache mode designated for the page P is not changed but where the tier disposition rule used with the timing of the previous redisposition changes.

Figure 23:
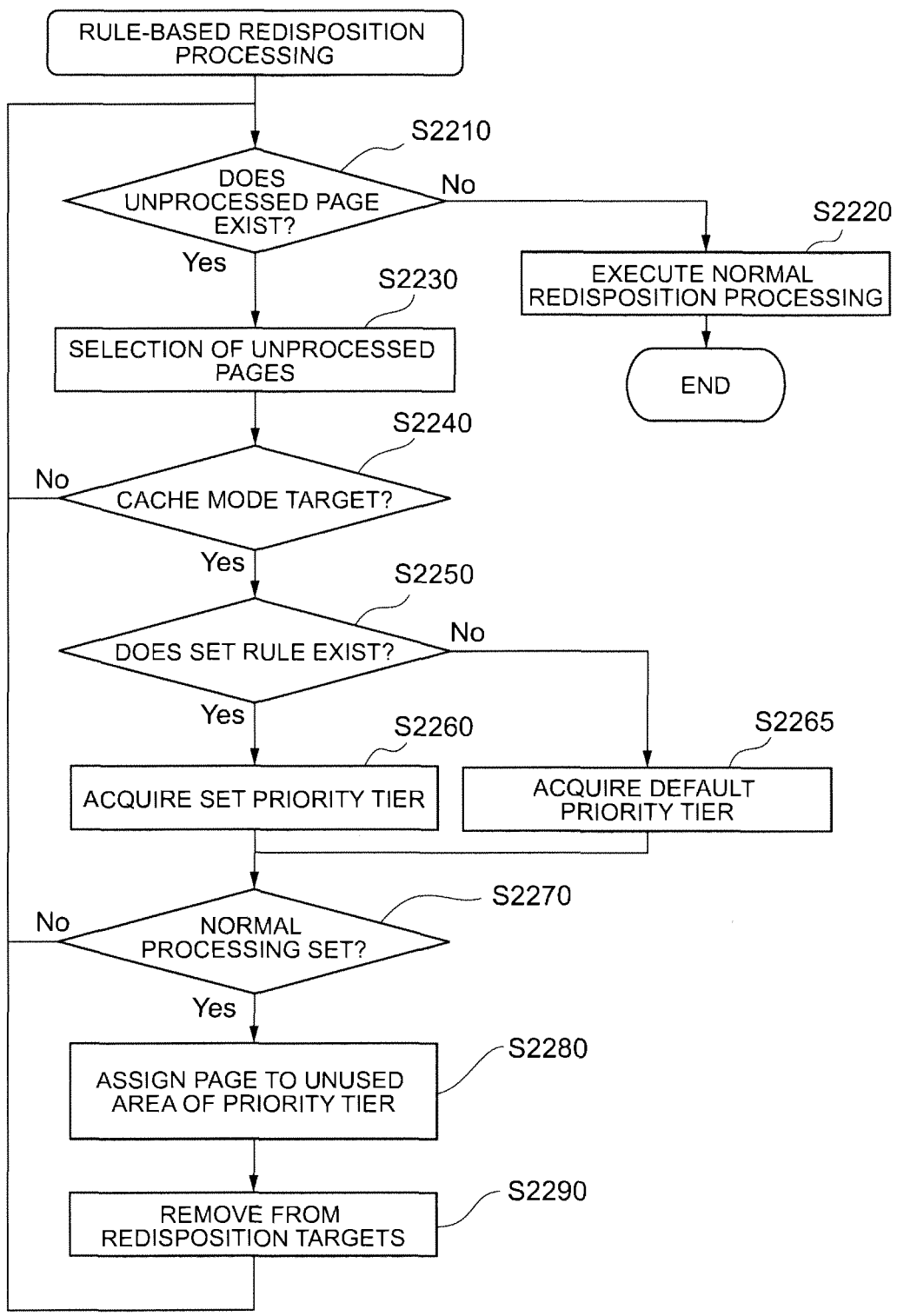
FIG. 23 is a flowchart showing the flow of redisposition processing which uses tier disposition rules according to this embodiment.

As shown in FIG. 23, the tier disposition rule setting program 480 first determines whether an unprocessed page P remains (S2210). If no unprocessed page P remains, the tier disposition rule setting program 480 executes normal redisposition processing (S2220). If, on the other hand, it is determined that an unprocessed page P remains, the virtual volume control program 470 selects the unprocessed page P and treats the selected page P as if the page were not unprocessed (S2230).

The tier disposition rule setting program 480 then determines whether a cache mode has been designated for the selected page P (S2240). If a cache mode has been designated in step S2240, the tier disposition rule setting program 480 repeats the processing of step S2210 and subsequent steps.

If, on the other hand, it is determined in step S2240 that a cache mode has been designated, the tier disposition rule setting program 480 determines whether there is a set rule for the cache mode (S2250). More specifically, the tier disposition rule setting program 480 uses the tier disposition rule management table 2000 to determine whether there is a set rule for the cache mode.

If it is determined in step S2250 that there is a set rule, the tier disposition rule setting program 480 acquires the set priority tier (S2260). If, on the other hand, it is determined in step S2250 that there is no set rule, the tier disposition rule setting program 480 acquires the priority tier designated by default (S2265).

The tier disposition rule setting program 480 determines whether the priority tier is to be determined using normal processing (S2270). Determining the storage tier 310 using normal processing in step S2270 means that the assigned storage tier 310 is determined from the access frequency using the same method as for a case where a cache mode has not been designated. Meanwhile, if it is determined in step S2270 that the storage tier 310 is determined using normal processing, the tier disposition rule setting program 480 repeats the processing starting with step S2210.

If it is determined in step S2270 that normal processing is not set, the tier disposition rule setting program 480 redisposes the page P in the priority tier acquired in step S2260 or S2265 (S2280).

Further, in normal redisposition processing which is subsequently effected (S2220), the tier disposition rule setting program 480 performs management so that the page P currently being handled is removed from the redisposition targets so that the page P is not moved again (S2290).

As a result of the foregoing redisposition processing, pages for which a cache mode has been designated can be redisposed according to rules set by the system administrator.

As described hereinabove, with this embodiment, when the cache mode is used to select the storage medium storing a storage area, selection rules can be determined in user system units. As a result, the practice of disposing read-ahead data of sequential access in the lower tier and disposing data not using the cache in the upper tier can be determined according to the user system operation, enabling the storage medium to be used effectively.

(3) Third Embodiment (3-1) Overview of Embodiment

According to a third embodiment, the storage area 310 of a data block which is resident in the cache memory 113 of the storage apparatus 100 is disposed in the lower tier according to a cache residency request from the management server 280 described in the second embodiment. If the host 200 is a mainframe, the cache residency request has a cache mode like the Bind designation. If the host 200 is not a mainframe and a command designating the cache mode has not been prepared, the cache residency request of this embodiment is able to cater to the I/O request from the host 200. The host 200 according to this embodiment may be represented by an open server, for example, and the I/O unit of an open server is logical block LBA (Logical Block Addressing).

The computer system according to this embodiment is the same as the second embodiment and hence a detailed description is omitted. The logical configuration of the storage apparatus 100 is similar to that of the second embodiment, except for the addition of a cache resident page management table 2300 and cache residency processing for processing cache residency requests, and therefore cache residency processing will be described in detail.

First, the cache resident page management table 2300 stored in the main memory of the storage apparatus 100 will be described. The cache resident page management table 2300 is a table for registering the LBA of the virtual volume 330 which is to be made resident in the cache configured by the management server 280 and, as shown in FIG. 24, comprises a virtual volume number field 2310, an LBA field 2320, and a mapped page field 2330.

Information identifying the virtual volume 330 is stored in the virtual volume number field 2310. The LBA field 2320 stores area address information in the virtual volume 330 which is used to specify an LBA. The mapped page field 2330 stores information identifying the page P to which the LBA is assigned. For example, if a page P has not been assigned to the LBA, the mapped page field 2330 stores information indicating non-assignment. Note that, in this embodiment, the size of the LBA and size of the page P match.

The LBA cache residency processing by the cache residency management program 490 will be described next. The LBA cache residency processing stores the LBA designated in the cache residency mode in the cache resident area 530 and redisposes the storage tier 310 assigned to the page P in the lower tier.

Figure 25:
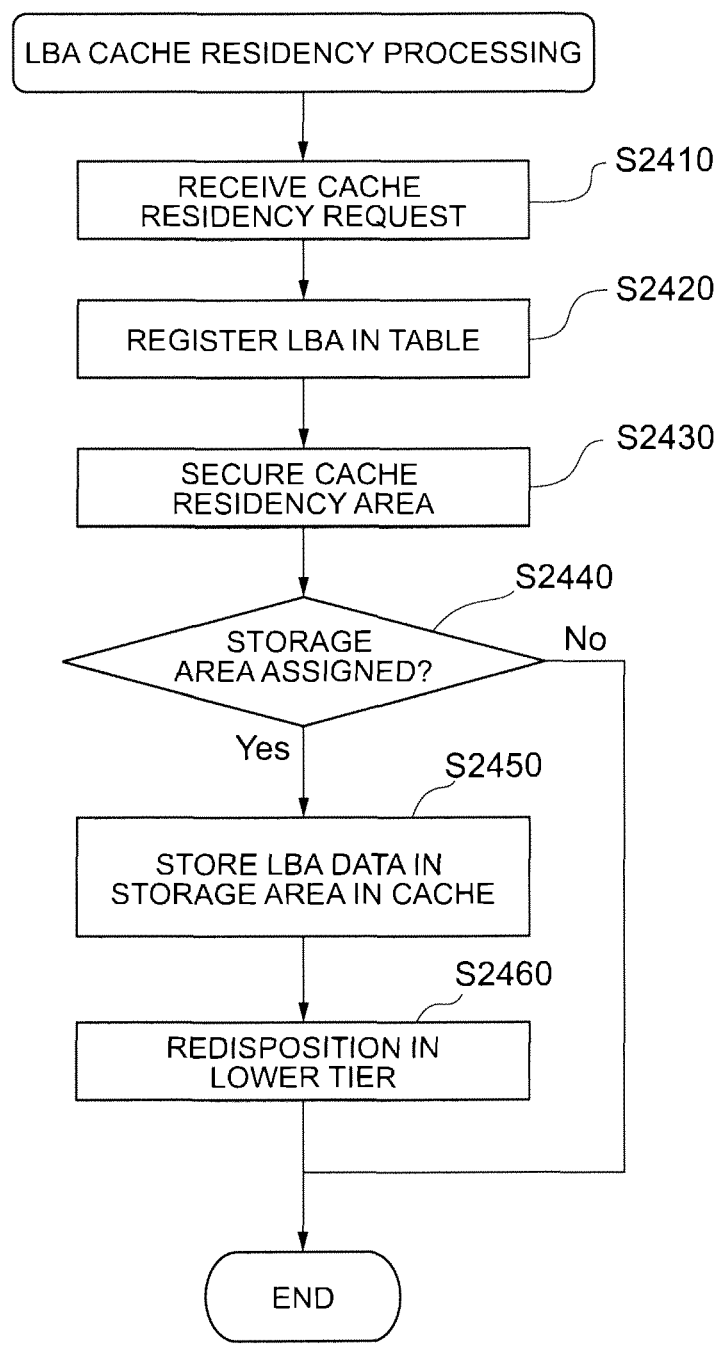
FIG. 25 is a flowchart showing the flow of LBA cache residency processing according to this embodiment.

As shown in FIG. 25, the cache residency management program 490 first receives an LBA and virtual volume 330 for cache residency from the management server 280 (S2410). Further, the cache residency management program 490 stores the virtual volume 330 and the LBA received from the management server 280 in step S2410 and information identifying the page P associated with the LBA, in the cache resident page management table 2300 (S2420).

The cache residency management program 490 then secures an area for cache residency in the cache memory 113 (S2430).

The cache residency management program 490 then determines whether the LBA has been assigned to a parity group PG (S2440). More specifically, the cache residency management program 490 determines whether the page P associated with the LBA is not unassigned in the virtual volume page assignment management table 450.

If it is determined in step S2440 that the page P associated with the LBA is unassigned, the cache residency management program 490 ends the processing. If, on the other hand, it is determined in step S2440 that the page P associated with the LBA is not unassigned, that is, that [the page P] has been assigned to a storage area 310, the cache residency management program 490 stores the LBA data in the cache memory 113 (S2450).

In addition, the cache residency management program 490 redisposes the LBA data in the lower tier (S2460). If [the page P] has already been assigned to the lower storage area 310 prior to redisposition in step S2460, the cache residency management program 490 does not perform redisposition processing.

(3-2) Advantageous Effects of Embodiment

The LBA which is to be made resident in the cache memory 113 can be redisposed in the lower storage area 310 by means of the foregoing LBA cache residency processing.

As described hereinabove, with this embodiment, by affording the LBA, which is to be made resident in the cache memory 113, residency in the cache memory 113, data for which high speed access to the storage devices 120 is deemed necessary can be disposed in the lower tier without waiting for the access monitoring time. Moreover, the upper tier media can be effectively used even in a computer system without an interface for designation of the cache mode by the host 200.

(4) Further Embodiments

For example, each of the steps of the processing by the storage apparatus 100 according to this specification need not necessarily be processed chronologically in the order presented as a flowchart. That is, each of the steps of the processing by the storage apparatus 100 may also be executed in parallel even in different processes.

Furthermore, computer programs which cause the hardware of the CPU, ROM, and RAM and the like contained in the storage apparatus 100 to exhibit the same functions as each of the foregoing configurations of the storage apparatus 100 can also be created. Further, a storage medium for storing the computer program is also provided.

Furthermore, in the foregoing embodiments, the processor 210 of the storage apparatus 100 realizes various functions of the present invention on the basis of various programs which are stored in the storage apparatus 100; however, the present invention is not limited to this example. For example, the processor 210 may be provided in another device separate from the storage apparatus 100 and various functions may be realized in co-operation with the processor 210. Moreover, the various programs stored in the storage apparatus 100 may also be provided in another device separate from the storage apparatus 100 and various functions may be realized as a result of the programs being called to the processor 210.

REFERENCE SIGNS LIST 1, 2 Computer system
100 Storage apparatus
200 Host
320 Virtual volume pool
330 Virtual volume
340 Extent
410 Cache mode management table
420 Extent management table
430 Virtual volume pool management table
440 Storage tier management table
450 Virtual volume page assignment management table
460 CFW area management table
470 Virtual volume control program
480 Tier disposition rule setting program
490 Cache residency management program

The invention claimed is:

1. A storage apparatus which is connected via a network to a host which issues data I/O requests, comprising:
   storage devices of a plurality of types of varying performance; and
   a control unit configured to manage each storage area provided by each of the storage devices of a plurality of types by means of storage tiers of a plurality of different types, and to assign storage areas in predetermined units to virtual volumes from any storage tier among the storage tiers of a plurality of types in accordance with a data write request from the host,
   wherein, when there is an I/O request from the host, the control unit is configured to store data corresponding to the I/O request in predetermined units in a cache memory and to determine the storage tier of the storage area assigned to the virtual volume storing the data according to a mode of writing to the cache memory,
   wherein the mode of writing to the cache memory includes a cache fast write mode in which data is written only to the cache memory and the host is notified of writing completion, and
   wherein, when the mode of writing the data corresponding to the I/O request to the cache memory is the cache fast write mode, the control unit is configured to assign a storage area in a lower tier to the virtual volume storing the data.

2. The storage apparatus according to claim 1,
wherein the control unit is configured to associate the mode of writing to the cache memory with each of the predetermined unit areas of the virtual volumes and, when the data is stored in the storage devices, to refer to the writing mode to determine the storage tier of the storage area assigned to the virtual volume storing the data.

3. The storage apparatus according to claim 1,
wherein, when data which is to be afforded residency in the cache memory is received from the host, the control unit is configured to store the data in the cache memory and to re-assign the lower storage tier to the virtual volume storing the data.

4. The storage apparatus according to claim 3,
wherein the host is a mainframe host, and
wherein the control unit is configured to assign storage areas to extent units of the virtual volumes.

5. The storage apparatus according to claim 3,
wherein, when a writing mode configured for an extent of the virtual volume comprising the data corresponding to the I/O request is the cache fast write mode, the control unit is configured to secure an area, which corresponds to the virtual volume extent, in the cache memory.

6. The storage apparatus according to claim 3,
wherein the host is a host other than a mainframe, and
wherein the control unit is configured to assign storage areas in page units of the virtual volumes.

7. The storage apparatus according to claim 1,
wherein, when an area storing the data is discarded from the cache memory, if the mode of writing to the cache memory configured in a predetermined unit area of the virtual volume corresponding to the area is the cache fast write mode, the control unit is configured to discard the predetermined unit area of the virtual volume.

8. The storage apparatus according to claim 1,
wherein a storage tier disposition rule which corresponds to the mode of writing to the cache memory is set via the management server, and
wherein, when there is an I/O request from the host, the control unit is configured to determine the storage tier of the storage area which is assigned to the virtual volume storing the data corresponding to the I/O request on the basis of the storage tier disposition rule thus set.

9. A data management method for a storage apparatus which comprises storage devices of a plurality of types of varying performance, and a control unit which manages each storage area provided by each of the storage devices of a plurality of types by means of storage tiers of a plurality of different types, and which assigns storage areas in page units to virtual volumes from any storage tier among the storage tiers of a plurality of types, the data management method comprising:

- a first step in which, when there is an I/O request from the host, the control unit stores the data corresponding to the I/O request in predetermined units in the cache memory; and
- a second step in which the storage tiers of the storage areas assigned to the virtual volumes storing the data are determined according to a mode of writing to the cache memory,
- wherein the mode of writing to the cache memory includes a cache fast write mode in which data is written only to the cache memory and which notifies the host of writing completion, and
- wherein, in the second step, when the mode of writing the data corresponding to the I/O request to the cache memory is the cache fast write mode, the control unit assigns a lower tier storage area to the virtual volume storing the data.

10. The data management method according to claim 9,
- wherein, when data which is to be afforded residency in the cache memory is received from the host, the control unit stores the data in the cache memory and re-assigns the lower storage tier to the virtual volume storing the data.

* * * * *